United States Patent
Nguyen et al.

(10) Patent No.: US 11,609,176 B2
(45) Date of Patent: Mar. 21, 2023

(54) METHODS AND DEVICES FOR EVALUATING PERFORMANCE OF A DIODE LASER

(71) Applicant: Becton, Dickinson and Company, Franklin Lakes, NJ (US)

(72) Inventors: An-Dien Nguyen, Fremont, CA (US); Waheed Amiri, Pleasanton, CA (US); David J. Gianduzzo, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 115 days.

(21) Appl. No.: 17/318,608

(22) Filed: May 12, 2021

(65) Prior Publication Data
US 2022/0026339 A1    Jan. 27, 2022

Related U.S. Application Data

(60) Provisional application No. 63/074,969, filed on Sep. 4, 2020, provisional application No. 63/056,360, filed on Jul. 24, 2020.

(51) Int. Cl.
*G01N 15/14*    (2006.01)
*G01J 1/02*    (2006.01)
*G01N 15/10*    (2006.01)

(52) U.S. Cl.
CPC ........... *G01N 15/1434* (2013.01); *G01J 1/02* (2013.01); *G01N 2015/1006* (2013.01); *G01N 2015/1493* (2013.01)

(58) Field of Classification Search
CPC ....... G01N 15/1434; G01N 2015/1006; G01N 2015/1493; G01N 15/1012; G01N 15/147; G01J 1/02; G01J 1/4257
See application file for complete search history.

(56) References Cited

U.S. PATENT DOCUMENTS

| | | | |
|---|---|---|---|
| 6,313,910 B1 * | 11/2001 | Garvey | G01J 1/4257 356/121 |
| 6,366,354 B1 | 4/2002 | Chandler | |
| 6,813,017 B1 | 11/2004 | Hoffman et al. | |
| 9,709,438 B2 * | 7/2017 | Robertson | G01J 1/4257 |

\* cited by examiner

*Primary Examiner* — Roy M Punnoose
(74) *Attorney, Agent, or Firm* — Bret E. Field

(57) ABSTRACT

Methods for evaluating performance a diode laser are provided. In embodiments, methods include receiving a laser beam profile of a diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting. Devices for practicing the subject methods are also provided, and include first and second stages configured to receive a diode laser and beam profiler, respectively. Aspects of the invention further include flow cytometers incorporating a diode laser that has been evaluated by the subject method.

18 Claims, 22 Drawing Sheets

FIG. 1A
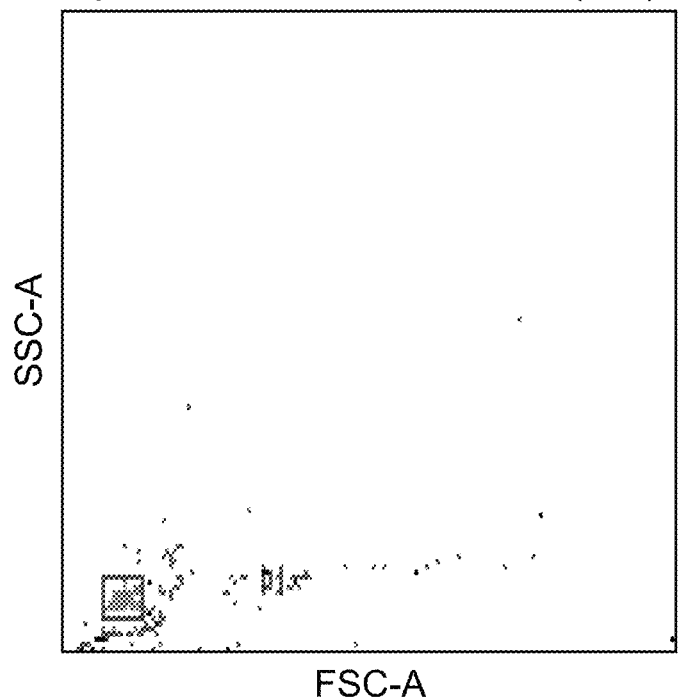
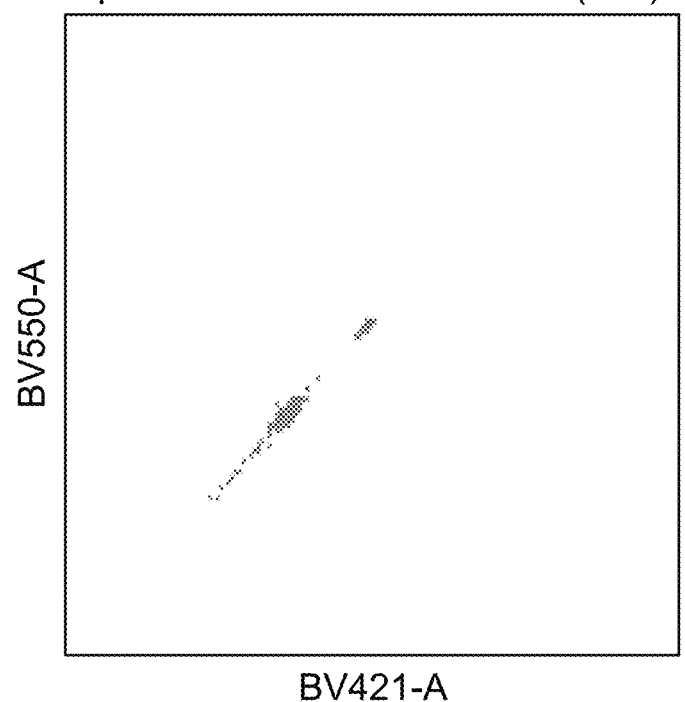

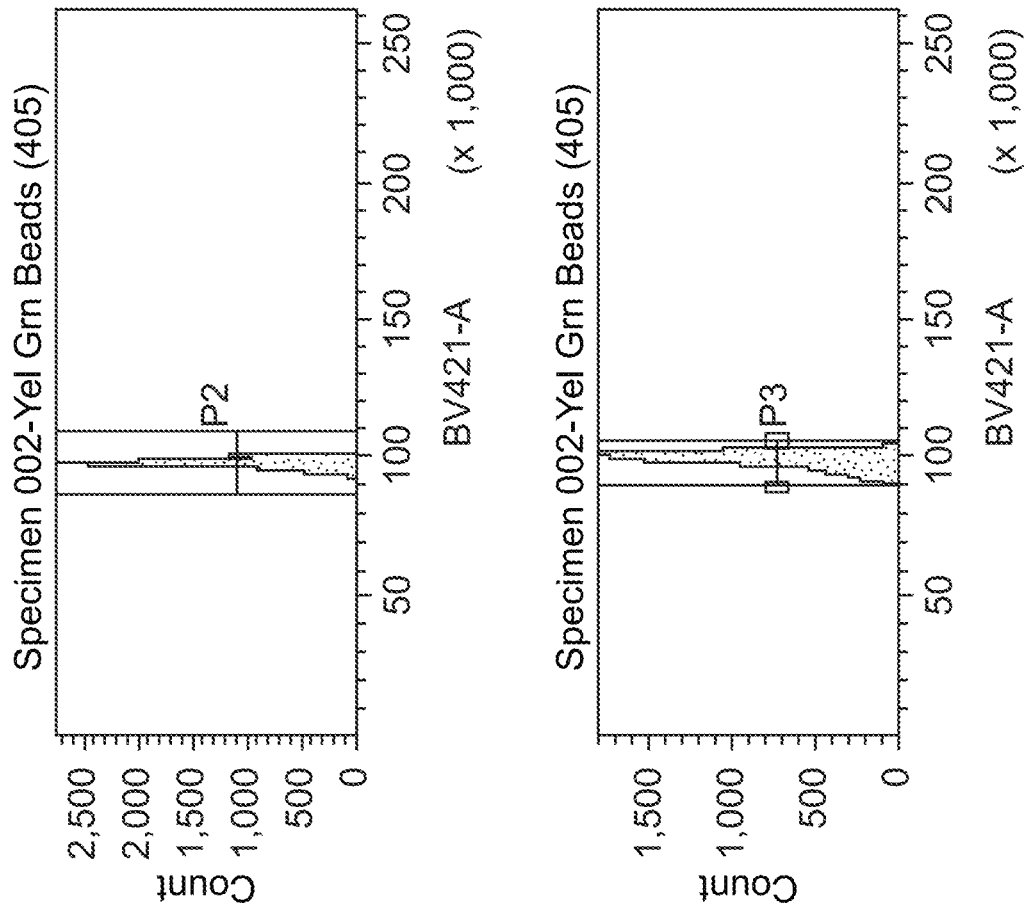

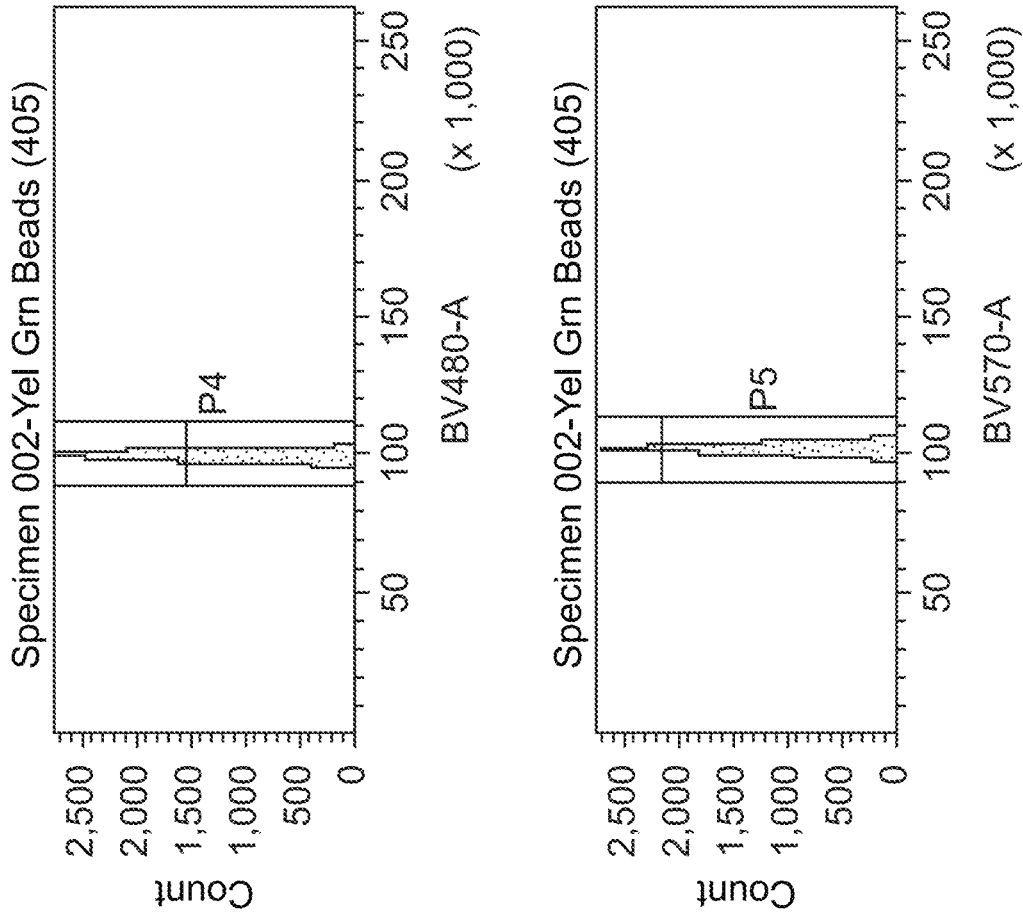

FIG. 4

| Result | ROI # | Value | Mean | S. Dev |
|---|---|---|---|---|
| 13.5% Width X (μm) | 1 | 796.688 | 794.410 | 0.4280 |
| 13.5% Width Y (μm) | 1 | 842.545 | 842.970 | 0.2088 |
| 90.0% Width X (μm) | 1 | 125.538 | 125.828 | 0.1828 |
| 90.0% Width Y (μm) | 1 | 194.132 | 194.139 | 0.1234 |
| σ sigma X (μm) | 1 | 816.185 | 815.863 | 0.4500 |
| σ sigma Y (μm) | 1 | 854.734 | 855.267 | 0.3576 |
| Centroid position X (μm) | 1 | 4537.148 | 4539.906 | 1.3549 |
| Centroid position Y (μm) | 1 | 4500.378 | 4500.403 | 1.3718 |
| Peak position X (μm) | 1 | 4503.167 | 4685.528 | 1.1581 |
| Peak position Y (μm) | 1 | 4459.688 | 4489.586 | 1.5222 |
| Goodness of fit X | 1 | 0.905 | 0.925 | 0.0000 |
| Roughness of fit X | 1 | 0.078 | 0.078 | 0.0001 |
| Goodness of fit Y | 1 | 0.962 | 0.952 | 0.0000 |
| Roughness of fit Y | 1 | 0.018 | 0.019 | 0.0001 |

METHODS AND DEVICES FOR EVALUATING PERFORMANCE OF A DIODE LASER

CROSS-REFERENCE

Pursuant to 35 U.S.C. § 119 (e), this application claims priority to the filing date of U.S. Provisional Patent Application Ser. No. 63/056,360 filed Jul. 24, 2020 and U.S. Provisional Patent Application Ser. No. 63/074,969 filed Sep. 4, 2020; the disclosures of which applications are incorporated herein by reference in their entirety.

INTRODUCTION

The characterization of analytes in biological fluids has become an important part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

Semiconductor laser diodes have recently gained popularity in flow cytometry as excitation source due to their low cost and long lifetime compared to conventional cavity based solid state lasers. However, their poor beam quality and non-Gaussian beam shape in the slow axis are the main drawbacks affecting flow instrument performance. The slow-axis laser diode beam profile is dominated by higher order modes deviating from pure Gaussian profile. It is imperative to screen diodes laser with poor beam shape to optimize flow performance. Commercial diode laser beam characterization tooling is based entirely on measuring beam quality factor ($M^2$), divergence, beam waist, and waist location. In some instances, however, a laser beam that exhibits values within acceptable ranges for the aforementioned parameters may still not be suitable for use in a flow cytometer. For example, the laser beam of interest may introduce an unacceptable amount of variability into emission spectra that are collected when that laser is used to irradiate samples within a flow cell. FIG. 1 shows coefficient of variation (CV) data for emission channels from a Coherent OBIS LX 405 nm laser, serial number S200114016. Despite repeated laser alignment optimization, the BV421 channel demonstrated failing CV even though the laser meets all standard specifications including $M^2$, beam divergence, beam waist, waist location, as well as subsystem specification such as horizontal and vertical beam width values. As such, methods and systems for characterizing non-Gaussian beam shapes emitting from semiconductor laser diodes are required.

SUMMARY

Aspects of the invention include methods for evaluating performance of a diode laser. In some embodiments, methods include receiving a laser beam profile of the diode laser comprising laser beam width data and laser intensity data. In some instances, the laser is a semiconductor laser diode. After laser profile data is received, methods include determining first, second and third laser beam widths at first, second and third laser intensities, respectively, for the laser beam profile. In embodiments, aspects of the invention further include computing a first ratio between the second and third laser beam widths and a second ratio between the first and second laser beam widths, and evaluating laser performance based on the first and second ratios. In certain embodiments, evaluating laser performance involves assessing the extent to which the laser beam profile deviates from a Gaussian beam shape. In addition, methods include outputting a determination regarding the suitability of the laser for use in a flow cytometry setting based on the evaluation. In some embodiments, the diode laser is evaluated in conjunction with one or more beam shaping optical components (i.e., lenses, collimators, etc.), and may be evaluated with respect to each of the horizontal laser beam profile and the vertical laser beam profile.

Aspects of the invention further include devices for evaluating diode laser performance. In some embodiments, devices include a first stage configured to receive a diode laser and a second stage with a beam profiler positioned thereon configured to be irradiated by the received diode laser. In certain embodiments, components of the device are positioned on a rail such that the components are slidable along the rail. In some embodiments, the first stage includes a heat sink into which the diode laser being evaluated and a number of beam shaping optical components may be placed. In embodiments, the components of the device are adjustable so that optical alignment between the diode laser and the beam profiler may be achieved or maintained. In some embodiments, the device is configured to evaluate the diode laser in conjunction with the one or more beam shaping optical components. Additional embodiments of the device include a target for ensuring alignment between the diode laser and beam profiler, a reference laser for optical alignment, and a camera. The subject devices further include a processor operably connected to the beam profiler comprising memory operably coupled to the processor wherein the memory comprises instructions stored thereon, which when executed by the processor, cause the processor to evaluate the diode laser.

Aspects of the invention further include flow cytometers that have been evaluated by a method including receiving a laser beam profile of the diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting. In certain embodiments, diode lasers that have received a favorable determination regarding the suitability of the laser for use in a flow cytometry setting following the evaluation of laser performance based on the first and second ratios are incorporated in the subject flow cytometers.

BRIEF DESCRIPTION OF THE FIGURES

The invention may be best understood from the following detailed description when read in conjunction with the accompanying drawings. Included in the drawings are the following figures:

FIG. 1 depicts coefficient of variation (CV) data from flow cytometry emission channels that are indicative of a diode laser that is unsuitable for use in a flow cytometry setting.

FIG. 4 depicts the determination of the second and third wavelengths at second and third laser intensities.

DETAILED DESCRIPTION

Figure 2:
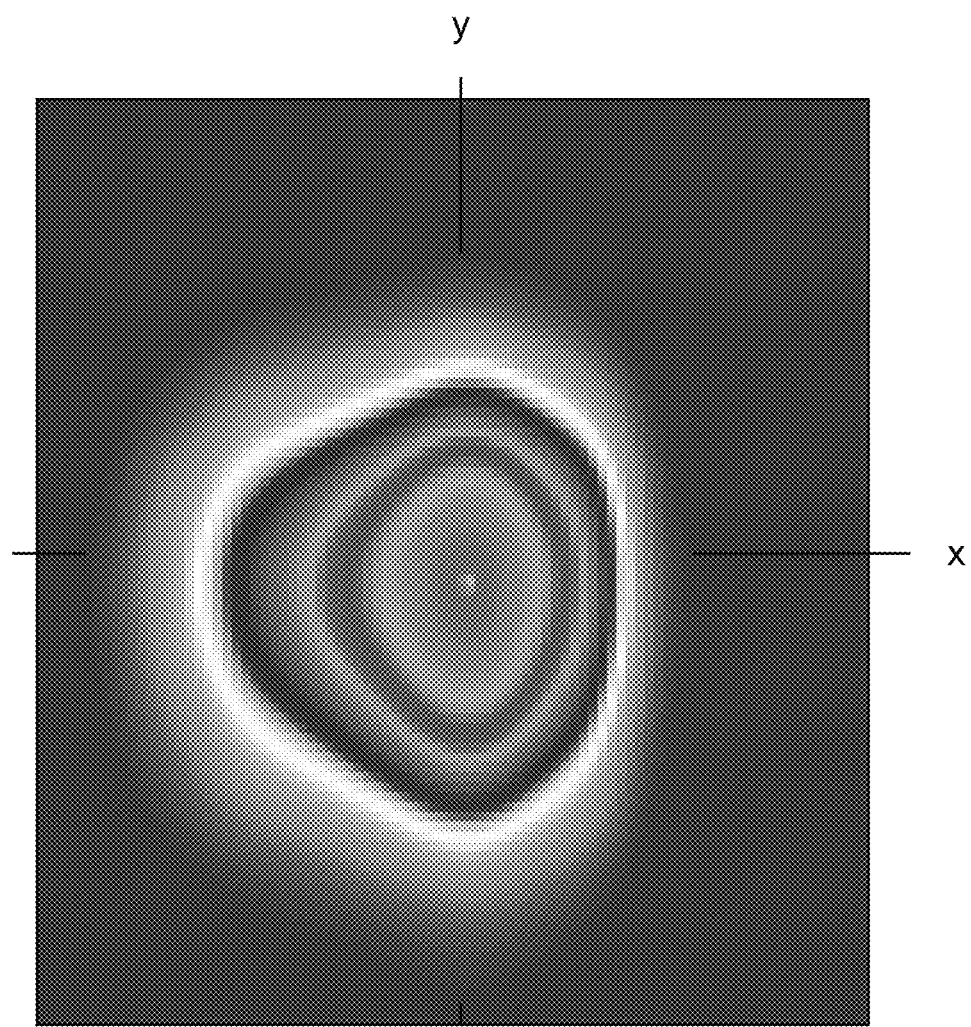
FIG. 2 is a representation of a two-dimensional cross-section of a diode laser beam that approximates Gaussian beam shape in the vertical direction, but not in the horizontal direction.

Methods for evaluating performance a diode laser are provided. In embodiments, methods include receiving a laser beam profile of a diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting. Devices for practicing the subject methods are also provided, and include first and second stages configured to receive a diode laser and beam profiler, respectively. Aspects of the invention further include flow cytometers incorporating a diode laser that has been evaluated by the subject method.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Evaluating Performance of a Diode Laser

As discussed above, methods of the present disclosure include evaluating performance of a diode laser. By "evaluating performance", it is meant assessing the functionality of the laser and determining characteristics of the laser light emanating therefrom. In embodiments, evaluating performance of a diode laser can include measuring laser light continuously. In other embodiments evaluating performance of a diode laser can include measuring laser light in discrete intervals. In further embodiments, evaluating performance of a diode laser includes detecting fluctuations in laser light intensity resulting from, e.g., factors such as changes in temperature, pressure and humidity. In certain embodiments, evaluating performance of a diode laser includes determining the suitability of the diode laser for use in a certain setting, e.g., in a flow cytometry setting. In other words, evaluating performance involves ascertaining the quality of the beam emitted by the diode laser and determining whether a laser emitting such a beam is appropriate for a given purpose, e.g., irradiating samples (i.e., particles, cells) in a flow cell and collecting data related to the characteristics of the samples.

A "diode laser"—also described as a "laser diode"—is herein referred to in its conventional sense as a device configured to directly convert electrical energy into light energy. In embodiments, the diode laser is a semiconductor laser diode, i.e., a laser that includes semiconductor gain media (i.e., the media for laser light amplification). In some embodiments, semiconductor laser diodes are pumped with an electrical current in the region between two semiconductor materials (i.e. "n-doped" and "p-doped" materials). In embodiments, the semiconductor laser diode is an optically pumped semiconductor laser in which light is used to excite a relevant medium to a higher energy state. In other embodiments, the laser is a quantum cascade laser, e.g., a quantum cascade laser that emits near-infrared light. In still other embodiments, the laser is an edge-emitting laser diode. In still other embodiments, the laser is an external cavity diode laser, e.g., including an anti-reflection coating and/or a collimating lens. In yet other embodiments, laser is a surface emitting semiconductor laser (VCSEL/VECSEL). In some instances, the laser is a continuous diode laser, such as an ultraviolet diode laser, a visible diode laser and a near-infrared diode laser. For example, the diode laser may be a 405 nm diode laser or a 488 nm diode laser. In some instances, the laser is a frequency doubled- or frequency tripled implementation of any of the above mentioned lasers. In some embodiments, components of the semiconductor laser diode may include materials such as, but not limited to, gallium arsenide (GaAs), aluminum gallium arsenide (AlGaAs), indium gallium phosphide (InGaP), gallium nitride (GaN), indium gallium arsenide (InGaAs), indium gallium arsenide nitride (GaInNAs), indium phosphide (InP), and gallium indium phosphide (GaInP), or combinations thereof.

In some embodiments, the subject diode lasers are semiconductor laser diodes described in, for example, U.S. Pat. Nos. RE41,643; 5,538,918; 6,798,815; 6,873,634; 6,985,505; 7,030,422; 7,283,243; 7,463,663; 7,664,151; 6,668,001; 7,033,350; 7,697,585; 7,701,992; 7,769,069; 7,843,980; 7,873,079; 8,085,825; 8,124,996; 8,331,412; 8,351,477; 8,811,443; 9,048,385; 9,905,991; 10,431,958; and 10,439,364; the disclosures of which with respect to diode lasers are incorporated herein by reference.

Aspects of the instant method further include receiving a laser beam profile of the diode laser. By "laser beam profile" it is meant the measured characteristics of laser light emitted by a given laser transverse to the path of laser beam propagation. In embodiments, the laser beam profile includes laser beam width data. Beam width as discussed herein is referred to in its conventional sense to describe the length of a line perpendicular to the laser beam axis of propagation that intersects the laser beam. Beam width may also be described as the beam diameter, i.e., twice the magnitude of the beam radius. As is known in the art of laser optics, the beam width varies at different cross-sections of the laser beam along the axis of propagation. For example, the beam width is at a minimum along the axis of propagation at a point referred to in the art as the "beam waist". In other words, the beam waist is the point along the propagation axis at which the laser possesses a beam focus. Beam width may be measured in any convenient unit. In some instances, beam width is measured in microns ($\mu m$). In some embodiments, the laser beam profile includes data regarding characteristics of the beam waist such as, but not limited to, its location along the beam axis and the angular spread of the beam on either side of the beam waist.

In embodiments, the subject laser beam profile also includes laser intensity data. Laser intensity as discussed herein is referred to in its conventional sense to describe the optical power of the laser beam per unit area transmitted to a surface that is perpendicular to the propagation direction. Laser intensity may be measured in any convenient unit. In some embodiments, laser intensity is measured in $W/cm^2$.

In additional embodiments, the laser beam profile includes information regarding beam quality. In some instances, beam quality measures the ability of a laser beam to focus on a particular location. In embodiments, beam quality is measured by the $M^2$ parameter. In such embodiments, a high $M^2$ is indicative of a low beam quality, while a low $M^2$ is indicative of high beam quality. $M^2$ may be calculated by obtaining the ratio of the beam's angle of divergence to that of a Gaussian beam with the same $D4\sigma$ waist width, where $D4\sigma$ (i.e., second-moment width) is four times the standard deviation of the marginal distribution of the beam profile.

In further embodiments, the laser beam profile further comprises beam divergence data. Beam divergence as discussed herein is referred to in its conventional sense to describe the angular measure of the increase in beam width as the beam expands from its focal point (i.e., the beam waist). A laser beam with a small angle of divergence possesses an approximately constant beam width (e.g., beam radius, beam diameter) over the distance the laser propagates.

In certain embodiments, the laser beam profile is received from a laser profiler. The laser profiler discussed herein is referred to in its conventional sense to describe an apparatus for capturing and recording a laser profile. Any convenient laser profiler may be used to capture and record the laser profile. In some instances, the laser profiler is a NanoScan™ laser profiler manufactured by Ophir® Phototonics, such as, but not limited to, the NanoScan™ 2s Si/3.5/1.8 beam profiler, the NanoScan™ 2s Si/9/5 beam profiler, the NanoScan™ 2s Ge/3.5/1.8 beam profiler, the NanoScan™ 2s Ge/9/5 beam profiler, the NanoScan™ 2s Pyro/9/5 beam profiler and the NanoScan™ 2s Pyro/9/5-MIR beam profiler. As such, in some instances, the beam profiler described herein is configured to capture and relay data related to the laser beam such as, but not limited to, laser intensity data, beam width data, beam quality ($M^2$) data, beam waist data, and beam divergence data.

After the laser beam profile is received, aspects of the invention further include determining a first laser beam width at a first laser intensity. As is known in the art, laser intensity may vary along different points along the width of the beam. As such, determining a first laser beam width at a first laser intensity includes obtaining the beam width associated with a given first laser intensity. In some instances, the first laser intensity is a fixed value chosen by a user. In other embodiments, the first laser intensity is defined as a percentage of the peak laser intensity observed in the laser profile. In such embodiments, the first laser intensity is 2% of the peak laser intensity. Accordingly, in some embodiments, determining a first laser beam width at a first laser intensity includes obtaining the peak laser intensity from the laser beam profile, computing the value of 2% of said peak laser intensity (i.e., the first laser intensity), and ascertaining the beam width at which the first laser intensity was observed.

In embodiments, aspects of the invention further include calculating a second laser beam width at a second laser intensity. In some embodiments, determining a second laser beam width at a second laser intensity includes obtaining the beam width associated with a given second laser intensity. In some instances, the second laser intensity is a fixed value chosen by a user. In other embodiments, the second laser intensity is defined as a percentage of the peak laser intensity observed in the laser profile. In such embodiments, the second laser intensity is 13.5% of the peak laser intensity. Accordingly, in some embodiments, determining a second laser beam width at a second laser intensity includes obtaining the peak laser intensity from the laser beam profile, computing the value of 13.5% of said peak laser intensity (i.e., the second laser intensity), and ascertaining the beam width at which the second laser intensity was observed.

In embodiments, aspects of the invention further include calculating a third laser beam width at a third laser intensity. In some embodiments, determining a third laser beam width at a third laser intensity includes obtaining the beam width associated with a given third laser intensity. In some instances, the third laser intensity is a fixed value chosen by a user. In other embodiments, the third laser intensity is defined as a percentage of the peak laser intensity observed in the laser profile. In such embodiments, the third laser intensity is 90% of the peak laser intensity. Accordingly, in some embodiments, determining a third laser beam width at a third laser intensity includes obtaining the peak laser intensity from the laser beam profile, computing the value of 90% of said peak laser intensity (i.e., the third laser intensity), and ascertaining the beam width at which the third laser intensity was observed.

After first, second and third laser beam widths have been determined at first, second and third laser intensities, respectively, aspects of the disclosure further include computing a first ratio. In embodiments, the first ratio is computed between the second beam width determined at the second laser intensity, and the third beam width determined at the third laser intensity. In embodiments, computation of the first ratio produces a dimensionless number, the magnitude of which provides a measure of laser beam profile deviation from a pure Gaussian beam shape.

Aspects of the disclosure further include computing a second ratio. In embodiments, the second ratio is computed between the first laser beam width determined at the first laser intensity, and the second laser beam width determined at the second laser intensity. In embodiments, computation of the second ratio produces a dimensionless number, the magnitude of which, in addition to the first ratio, provides a measure of laser beam profile deviation from a pure Gaussian beam shape.

In some embodiments, the methods further include evaluating diode laser performance based on the computed first and second ratios. In such embodiments, evaluating diode laser performance may include assessing the extent to which the laser profile deviates from a Gaussian beam shape. In an ideal Gaussian beam (i.e., a beam producing a laser profile following a Gaussian distribution), a laser beam profile can be described with a Gaussian function defined by Equation 1:

$$I(r) = I_0 \exp\left(\frac{-2r^2}{w(z)^2}\right) = \frac{2P}{\pi w(z)^2} \exp\left(\frac{-2r^2}{w(z)^2}\right)$$

As shown above, $I_0$ is the peak laser intensity at the center of the laser beam, r is the radial distance away from the axis, w(z) is the radius of the laser beam where the irradiance is $1/e^2$ (13.5%) of $I_0$, z is the axial distance from the beam waist, and P is the total power of the beam. Accordingly, in some instances, evaluating diode laser performance includes evaluating the magnitude of a laser beam profile's deviation from a pure Gaussian profile (e.g., as defined by Equation 1). In such instances, a large value computed for the first ratio is indicative of a deviation from Gaussian beam shape. Similarly, in some embodiments, a large value calculated for the second ratio is indicative of a deviation from a Gaussian beam shape. Therefore, in embodiments, the magnitude of the first and/or second ratio is proportional to the amount that a particular portion of a laser beam profile deviates from an ideal Gaussian shape.

In additional embodiments, evaluating laser performance further includes determining the manner in which a laser beam profile deviates from ideal beam shape, i.e., identifying whether a certain subtype of deviation is present in the laser beam profile. For example, in some embodiments, assessing the extent to which the laser beam profile deviates from a Gaussian beam shape involves identifying whether multiple modes are present in the laser beam profile. As is known in the art of laser optics, a laser beam profile exhibits multiple modes when self-consistent distributions are observed in laser light. Different types of modes can be produced depending on the configuration of the laser resonator. In some instances, the laser beam is characterized as a Laguerre-Gaussian beam in which cylindrical higher-order modes are present. In other instances, the laser beam is characterized as a Hermite-Gaussian beam in which rectangular higher-order modes are present. In some embodiments, identifying whether multiple modes are present in the laser beam profile includes the observation of a large value obtained for the first ratio. In other embodiments, identifying whether multiple modes are present in the laser beam profile includes the observation of a of a large value obtained for the second ratio. In still other embodiments, identifying whether multiple modes are present in the laser beam profile includes the observation of a large value obtained for both the first and the second ratio.

In some embodiments, assessing the extent to which the laser beam profile deviates from a Gaussian beam shape includes identifying whether a wide bottom is present in the laser beam profile. As discussed herein, a laser beam profile exhibits a wide bottom when the graph resulting from laser intensity being plotted as a function of position possesses a deviation from pure Gaussian beam shape such that one or more tails of the curve encompass a disproportionately large area relative to the remainder of the curve (i.e., when the area under the curve is calculated via integration) than would be expected assuming a pure Gaussian beam shape. In some embodiments, identifying whether a wide bottom is present in the laser beam profile includes the observation of a large value obtained for the second ratio. In such embodiments, the presence of a wide bottom in the laser beam profile will lead to values computed for the second ratio that are outside of parameters that would normally be indicative of a Gaussian beam shape. In some instances where such values are computed for the second ratio, a determination is made indicating that the diode laser being evaluated is not suitable for use in the setting of interest, e.g., a flow cytometry setting.

In embodiments, assessing the extent to which the laser beam profile deviates from a Gaussian beam shape includes identifying whether a narrow peak is present in the laser beam profile. As discussed herein, laser beam profile exhibits a narrow peak when the graph resulting from laser intensity being plotted as a function of position possesses a deviation from pure Gaussian beam shape such that the peak of the curve possesses a disproportionately small area relative to the remainder of the curve (i.e., when the area under the curve is calculated via integration) than would be expected assuming a pure Gaussian beam shape. In some embodiments, identifying whether a narrow peak is present in the laser beam profile includes the observation of a large value obtained for the first ratio. In such embodiments, the presence of a narrow peak in the laser beam profile will lead to values computed for the first ratio that are outside of parameters that would normally be indicative of a Gaussian beam shape. In some instances where such values are computed for the first ratio, a determination is made indicating that the diode laser being evaluated is not suitable for use in the setting of interest, e.g., a flow cytometry setting.

In some embodiments, assessing the extent to which the laser beam profile deviates from a Gaussian beam shape includes identifying whether a sidelobe pattern is present in the laser beam profile. In some embodiments, a sidelobe pattern may involve a beam shape containing one or more intensity sub-maxima in addition to the central peak. In some embodiments, identifying whether a sidelobe pattern is present in the laser beam profile includes the observation of a large value obtained for the first ratio. In other embodiments, identifying whether a sidelobe pattern is present in the laser beam profile includes the observation of a large value obtained for the second ratio. In still other embodiments, identifying whether a sidelobe pattern is present in the laser beam profile includes the observation of a large value obtained for both the first and the second ratio. In embodiments, the presence of a sidelobe pattern in the laser beam profile will lead to values computed for the first and/or secondf ratio that are outside of parameters that would normally be indicative of a Gaussian beam shape. In some instances where such values are computed for the first and/or second ratio, a determination is made indicating that the diode laser being evaluated is not suitable for use in the setting of interest, e.g., a flow cytometry setting.

In some embodiments, the diode laser is evaluated in conjunction with one or more beam shaping optical components. In other words, the laser beam produced by the diode laser may pass through, and be modulated by, one or more beam shaping optical components before and/or after the beam shaping optical component is placed in the optical path of the diode laser. By "beam shaping optical component", it is meant a device configured to alter characteristics of the laser beam by, e.g., changing the beam direction, changing the shape of the beam, focusing the beam, etc. In embodiments, beam shaping optical components include but are not limited to, lenses, mirrors, filters, fiber optics, wavelength separators, pinholes, slits, collimating protocols and combinations thereof that can be arranged as desired. In certain embodiments, the one or more subject beam shaping optical components are beam collimators, telescopes, beam expanders, prism pairs, or focusing components. Therefore, in some embodiments, a diode laser of interest may be evaluated in conjunction with the beam shaping optical component, e.g., to ascertain if the beam is altered in such a way to render the laser unsuitable for use in a certain setting (e.g., a flow cytometry setting). In embodiments, methods include evaluating the diode laser in conjunction with 1 or more beam shaping optical components, such as 2 or more, 3 or more, 4 or more and including 5 or more beam shaping optical components. In some embodiments including 2 or more beam shaping optical components, each beam shaping optical component is the same type of beam shaping optical component. For example, the diode laser may be evaluated in conjunction with two different lenses placed in the optical path of the laser. In other embodiments, the 2 or more beam shaping optical components are different types of beam shaping optical components.

In embodiments where the diode laser in evaluated in conjunction with a beam shaping optical component, methods may further include optically aligning the laser and beam shaping optical component. In some embodiments, optical alignment includes adjusting the position of the laser and/or beam shaping optical component such that the beam produced by the laser contacts the beam shaping optical component in the manner intended. In embodiments, optically aligning the laser and the beam shaping optical component includes ensuring that the laser beam passes through the precise center of the beam shaping optical component.

In some embodiments, evaluating diode laser performance involves evaluating performance with respect to each of a horizontal laser beam profile and a vertical laser beam profile. As is known in the art, a laser beam may be analyzed with respect to both horizontal and vertical cross-sections. As such, in some embodiments, the laser beam profile may include a horizontal laser beam profile and a vertical laser beam profile in which the laser beam is characterized with respect to the vertical cross-section and horizontal cross-section, respectively. Evaluating laser performance with respect to each of the horizontal laser beam profile and the vertical laser beam profile may therefore include performing the evaluation steps described above for each of the horizontal and vertical profiles. For example, in some embodiments, a first and second ratio (calculated as described above) may be computed with respect to the horizontal direction, and separate set of first and second ratios may be computed for the vertical direction. In some instances, analysis of the first and second ratios (e.g., as described above) may indicate that the laser beam of interest diverges from Gaussian beam shape in the horizontal direction, but exhibits Gaussian beam shape in the vertical direction, or vice versa.

Figure 3:
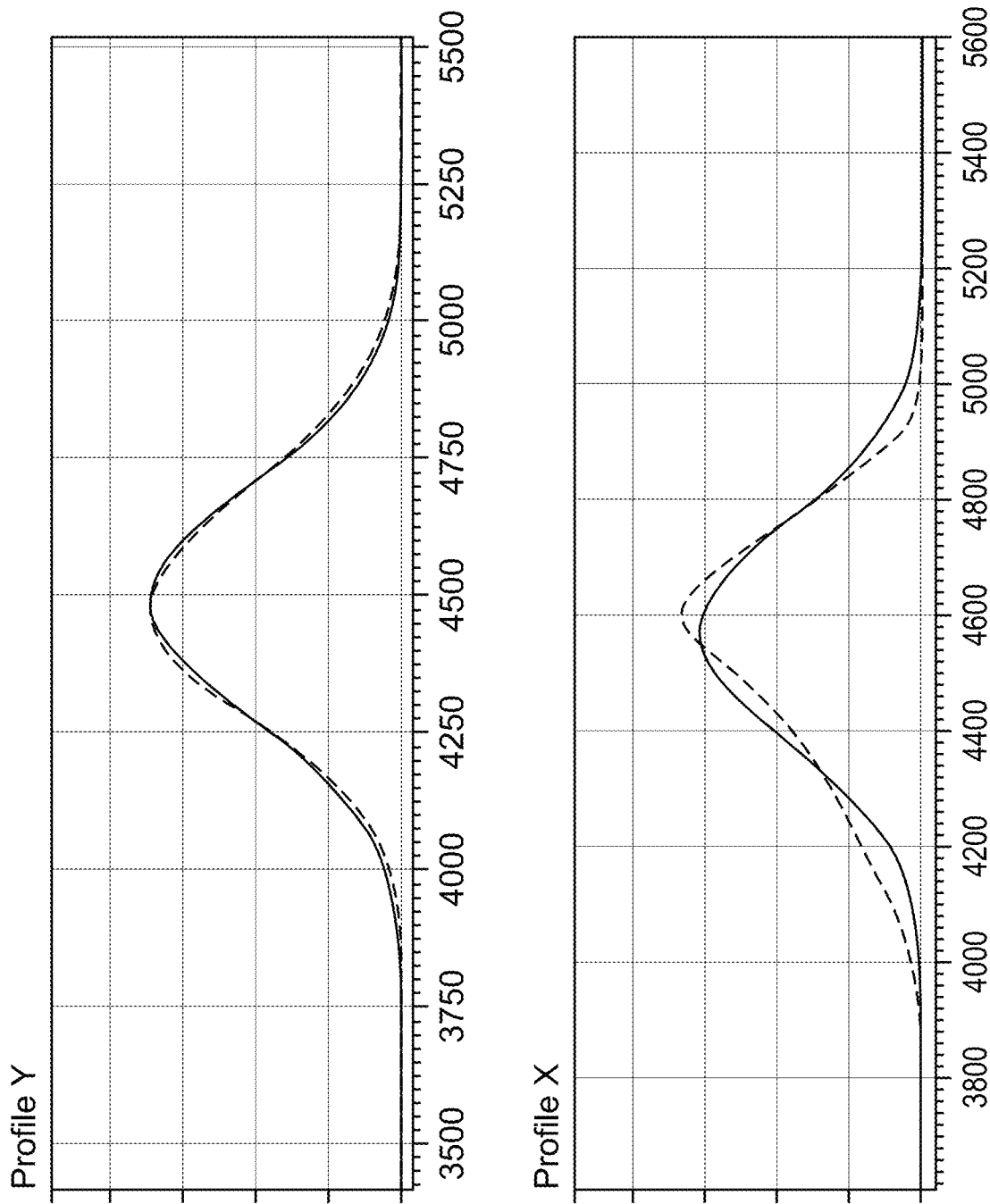
FIG. 3A-B depict laser beam profiles generated with respect to the vertical and horizontal direction of the diode laser beam.

For example, FIG. 2 depicts a two-dimensional cross-section of a diode laser beam that approximates Gaussian beam shape in the vertical direction, but not in the horizontal direction. FIG. 3A depicts a laser beam profile generated with respect to the vertical direction of the diode laser beam depicted in FIG. 2, and FIG. 3B depicts a laser beam profile of the horizontal direction of the diode laser beam depicted in FIG. 2. In comparing FIG. 3A and FIG. 3B, it is shown that the vertical laser beam profile exhibits a Gaussian distribution, while the horizontal laser beam profile exhibits a wide bottom and narrow peak, i.e., indicators of non-Gaussian beam shape. FIG. 4 depicts the determination of the second and third wavelengths at second (13.5% of peak laser intensity) and third (90% of peak laser intensity) laser intensities for each of the vertical laser beam profile depicted in FIG. 3A and the horizontal laser beam profile depicted in FIG. 3B. As discussed in detail above, the first ratio is computed between the second and third laser beam widths. As such, the first ratio obtained for the vertical direction is 843.545 μm/194.120 μm=4.3 and the first ratio obtained for horizontal direction is computed from 796.683 μm/125.530 μm=6.34. As the first ratio computed for the horizontal direction is significantly higher than the first ratio computed for the vertical direction (exhibiting a Gaussian beam shape), this indicates that the laser beam depicted in FIG. 2 does not exhibit pure Gaussian beam shape, and a determination can consequently be made and outputted to the user that the laser is not suitable for use in flow cytometry.

As discussed above, in embodiments, evaluating diode laser performance with respect to each of the horizontal and vertical directions includes determining the suitability of the diode laser for use in a particular setting, e.g., a flow cytometry setting. For example, in standard laser geometry when the diode laser slow axis (i.e., light encountering a higher index of refraction) corresponds to the flow cell's horizontal direction, the non-Gaussian laser profile observed at the focusing plane where the laser beam intersects the flow stream (i.e., of a flow cytometer) would directly cause failing or high CV with characteristically high first and second ratios compared to pure horizontal Gaussian profile. In some cases when the diode orientation is rotated by 90 degrees, with the slow axis corresponding to the flow cell vertical direction, strong sidelobes and a wide bottom observed in the vertical direction of the non-Gaussian beam profile would result in high abort rates (i.e., an event in flow cytometry not being counted) and failing area scaling factor (i.e., where a flow instrument is not able to properly calculate the area of the pulse it measures) with typically high first and second ratios compared to pure vertical Gaussian profile. As such, when the diode laser is evaluated with respect to each of the horizontal and vertical directions, high values obtained for the first and second ratios are predictive of negative outcomes (e.g., failing/high CV, abort rates, failing area scaling factor) should that laser be employed in flow cytometry experiments. Accordingly, in embodiments, the values obtained for the first and second ratios evaluated with respect to each of the horizontal and vertical laser profiles may serve as a basis for outputting a determination regarding the suitability of the diode laser for use in a flow cytometry setting.

As discussed above, methods may include generating and outputting a determination regarding the suitability of a particular laser for use in a particular setting, e.g., a flow cytometry setting. In some embodiments, the determination is a binary determination. In such embodiments, the determination may indicate that the diode laser either is or is not suitable for use in the setting of interest. In other embodiments, the determination is one of multiple possible determinations existing along a continuum from not suitable to suitable. In such embodiments, intermediate determinations may be outputted that qualitatively indicate the performance of the laser, i.e., a given diode laser may be more or less suitable for use in a particular setting (e.g., a flow cytometry setting) than another laser.

Aspects of the instant methods also involve irradiating a sample in a flow cell with a diode laser that has been evaluated by the above method. In such embodiments, a sample having particles is irradiated with an evaluated diode laser and light from the sample is detected to generate populations of related particles based at least in part on the measurements of the detected light. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Aspects of the present invention include collecting fluorescent light with a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescent light detectors, such as 2 or more, such as 3 or more, such as 4 or more, such as 5 or more, such as 6 or more, such as 7 or more, such as 8 or more, such as 9 or more, such as or more, such as 15 or more and including 25 or more fluorescent light detectors. In embodiments, each of the fluorescent light detectors is configured to generate a fluorescence data signal. Fluorescence from the sample may be detected by each fluorescent light detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample. In embodiments, fluorescent flow cytometer data is received from one or more fluorescent light detectors (e.g., one or more detection channels), such as 2 or more, such as 3 or more, such as 4 or more, such as 5 or more, such as 6 or more and including 8 or more fluorescent light detectors (e.g., 8 or more detection channels).

Devices for Evaluating Performance of a Diode Laser

Aspects of the invention also include devices for evaluating performance of a diode laser. As discussed above, by "evaluating performance", it is meant assessing the functionality of the laser and determining characteristics of the laser light emanating therefrom. In embodiments, evaluating performance of a diode laser can include measuring laser light continuously. In other embodiments evaluating performance of a diode laser can include measuring laser light in discrete intervals. In further embodiments, evaluating performance of a diode laser includes detecting fluctuations in laser light intensity resulting from, e.g., factors such as changes in temperature, pressure and humidity. In certain embodiments, evaluating performance of a diode laser includes determining the suitability of the diode laser for use in a certain setting, e.g., in a flow cytometry setting. In other words, evaluating performance involves ascertaining the quality of the beam emitted by the diode laser and determining whether a laser emitting such a beam is appropriate for a given purpose, e.g., irradiating samples (i.e., particles, cells) in a flow cell and collecting data related to the characteristics of the samples.

In some embodiments, the subject device includes a first stage configured to receive the diode laser being evaluated. In some embodiments, the first stage includes a platform upon which the diode laser can be affixed, and a base. In embodiments, the first stage is adjustable in the x and y directions, i.e., so that the height and lateral positioning of the stage may be altered as desired. In additional embodiments, the tilt and yaw of the first stage is adjustable. In some embodiments, the device further includes a heat sink configured to dissipate heat generated by the diode laser. In such embodiments, the heat sink is configured to receive the diode laser and then be affixed to the first stage. In additional embodiments, the heat sink may be further configured to receive one or more beam shaping optical components, i.e., to modulate the laser beam emitted by the laser. In embodiments, the diode laser is a semiconductor laser diode, i.e., a laser that includes semiconductor gain media (i.e., the media for laser light amplification). In some embodiments, the subject semiconductor laser diodes are pumped with an electrical current in the region between two semiconductor materials (i.e. "n-doped" and "p-doped" materials). In embodiments, the semiconductor laser diode is an optically pumped semiconductor laser in which light is used to excite a relevant medium to a higher energy state. In other embodiments, the laser is a quantum cascade laser, e.g., a quantum cascade laser that emits near-infrared light. In still other embodiments, the laser is an edge-emitting laser diode. In still other embodiments, the laser is an external cavity diode laser, e.g., including an anti-reflection coating and/or a collimating lens. In yet other embodiments, laser is a surface emitting semiconductor laser (VCSEL/VECSEL). In some instances, the laser is a continuous diode laser, such as an ultraviolet diode laser, a visible diode laser and a near-infrared diode laser. For example, the diode laser may be a 405 nm diode laser or a 488 nm diode laser. In some instances, the laser is a frequency doubled- or frequency tripled implementation of any of the above mentioned lasers. In some embodiments, components of the semiconductor laser diode may include materials such as, but not limited to, gallium arsenide (GaAs), aluminum gallium arsenide (AlGaAs), indium gallium phosphide (InGaP), gallium nitride (GaN), indium gallium arsenide (InGaAs), indium gallium arsenide nitride (GaInNAs), indium phosphide (InP), and gallium indium phosphide (GaInP), or combinations thereof. In some embodiments, the subject diode lasers are semiconductor laser diodes described in, for example, U.S. Pat. Nos. RE41,643; 5,538,918; 6,798,815; 6,873,634; 6,985,505; 7,030,422; 7,283,243; 7,463,663; 7,664,151; 6,668,001; 7,033,350; 7,697,585; 7,701,992; 7,769,069; 7,843,980; 7,873,079; 8,085,825; 8,124,996; 8,331,412; 8,351,477; 8,811,443; 9,048,385; 9,905,991; 10,431,958; and 10,439,364; the disclosures of which with respect to laser diodes are incorporated herein by reference.

In addition, aspects of the invention further include a second stage with a beam profiler positioned thereon. In some embodiments, the second stage includes a platform upon which the beam profiler can be affixed, and a base. In some embodiments, the second stage is adjustable in the x and y directions, i.e., so that the height and lateral positioning of the stage may be altered as desired. The laser beam profiler discussed herein is referred to in its conventional sense to describe an apparatus for capturing and recording a laser profile. Any convenient laser profiler may be used to capture and record the laser profile. In some instances, the laser profiler is a NanoScan™ laser profiler manufactured by Ophir® Phototonics, such as, but not limited to, the NanoScan™ 2s Si/3.5/1.8 beam profiler, the NanoScan™ 2s Si/9/5 beam profiler, the NanoScan™ 2s Ge/3.5/1.8 beam profiler, the NanoScan™ 2s Ge/9/5 beam profiler, the NanoScan™ 2s Pyro/9/5 beam profiler and the NanoScan™ 2s Pyro/9/5-MIR beam profiler. As such, in some instances, the beam profiler described herein is configured to capture and relay data related to the laser beam such as, but not limited to, laser intensity data, beam width data, beam quality ($M^2$) data, beam waist data, and beam divergence data.

In embodiments, the device may further include a target for optically aligning the laser and the beam profiler. In such embodiments, the target may be located between the first stage and the second stage such that the laser positioned upon the first stage can be aligned to the crosshairs on the target. If the laser beam does not correctly align with the target, it can be determined that the laser is not sufficiently optically aligned with the beam profiler.

Figure 5:
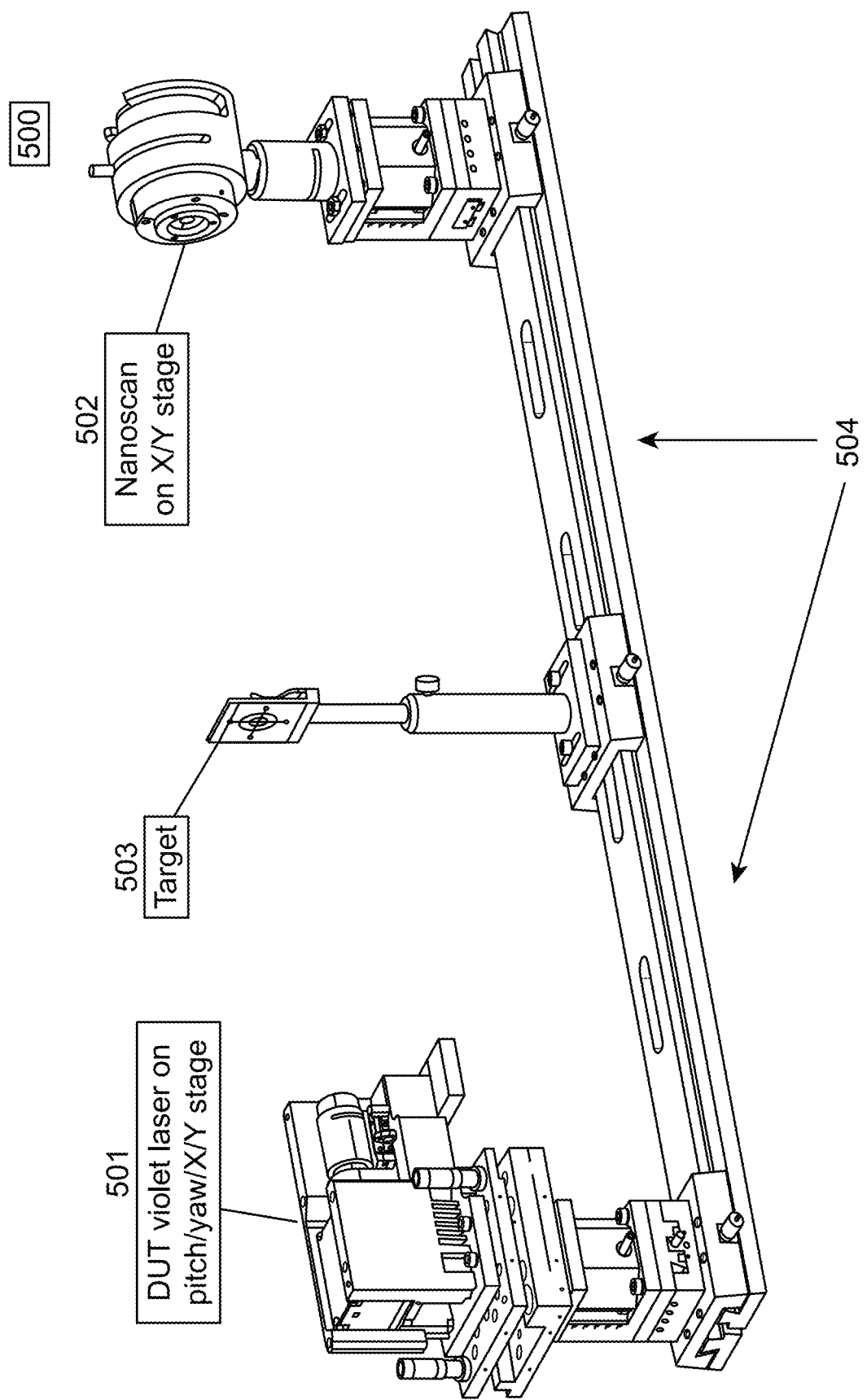
FIG. 5 depicts a device for evaluating diode laser performance according to certain embodiments.

Embodiments of the device further include a rail upon which one or more components of the device are slidable. For example, the bases of the first platform, the second platform and the target may possess complementary shapes relative to the top of the rail such that said components are affixed to the rail but may be slid along the rail, if desired. If it is desirable for any of the aforementioned components to remain stationary along the rail, the device may include a means for tightening the base of the components to the rail (e.g., screws). For example, FIG. 5 depicts one embodiment of the device. As shown in FIG. 5 device 500 includes a first stage 501 with a laser and heat sink positioned thereon and a second stage 502 with a beam profiler positioned thereon. Positioned between the first and second stages is a target 503 for optically aligning the laser positioned on the first stage and the beam profiler positioned on the second stage. Each of the first stage 501, second stage 502 and target 503 is positioned on a rail 504. Because the bases of the first stage 501, second stage 502 and target 503 possess complementary shapes relative to the rail 501, the components are slidable upon said rail.

Figure 6A:
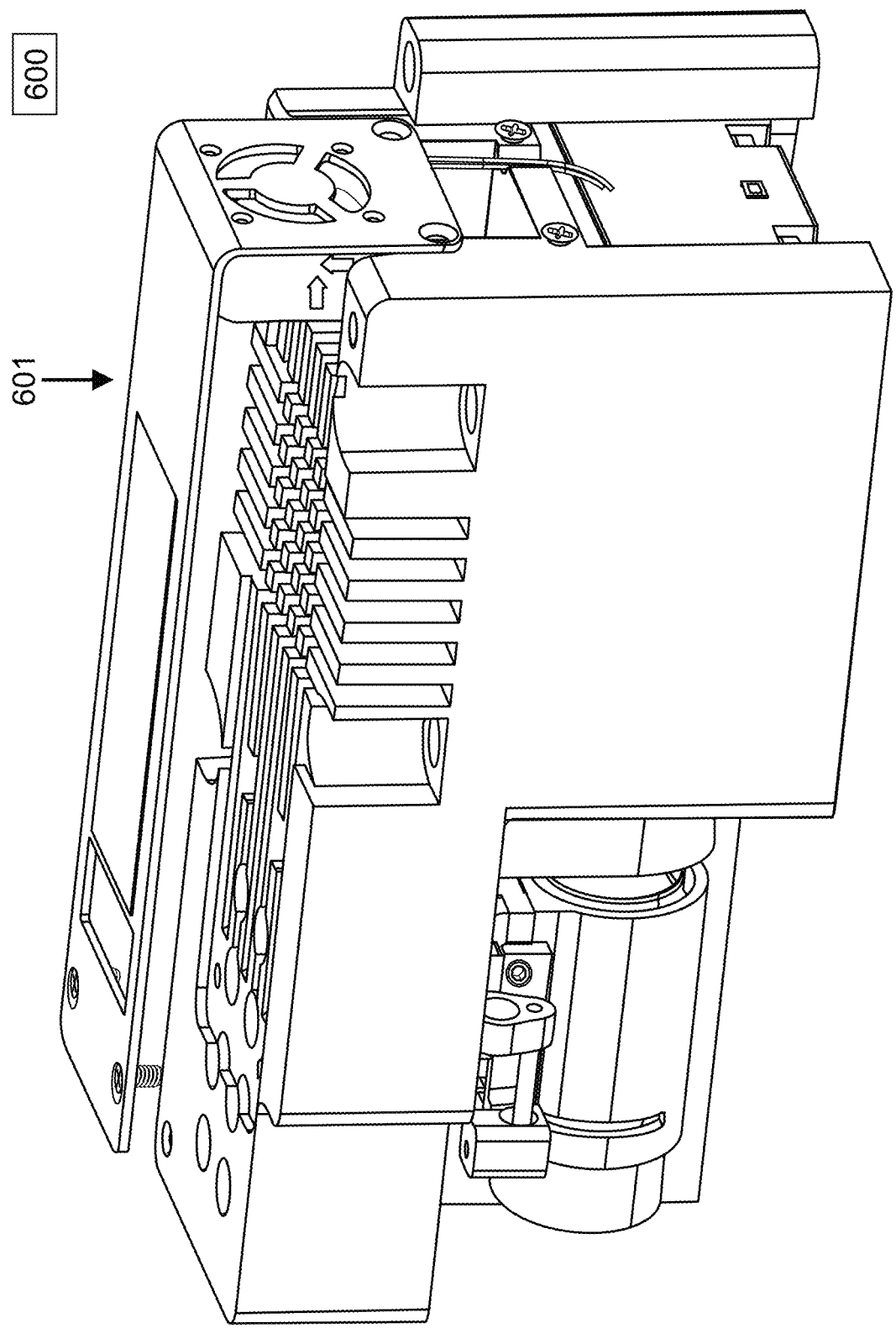
FIG. 6A-B depict a heat sink according to certain embodiments.
Figure 6B:
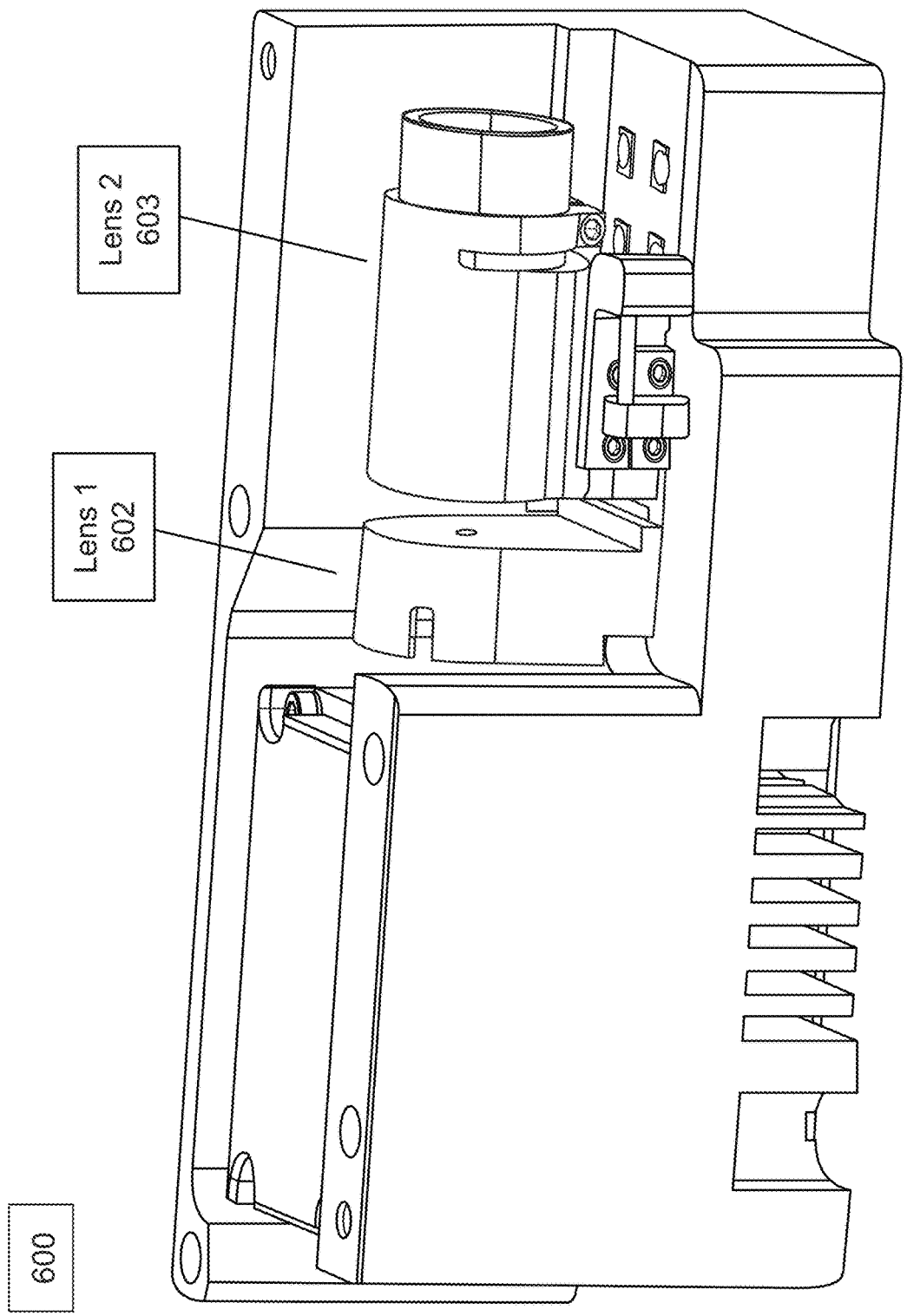

FIG. 6A-B depict embodiments of the heat sink configured to dissipate heat generated by the laser. As shown in FIG. 6A the heat sink includes a removable cover 601. Cover 601 is removed, for example, when the diode laser being evaluated is placed in the heat sink. FIG. 6B depicts an alternative view of the heat sink. As shown in FIG. 6B, the heat sink is configured to receive one or more beam shaping optical components, such as lens 602 and lens 603, to modulate the laser beam being emitted from the diode laser.

Figure 7:
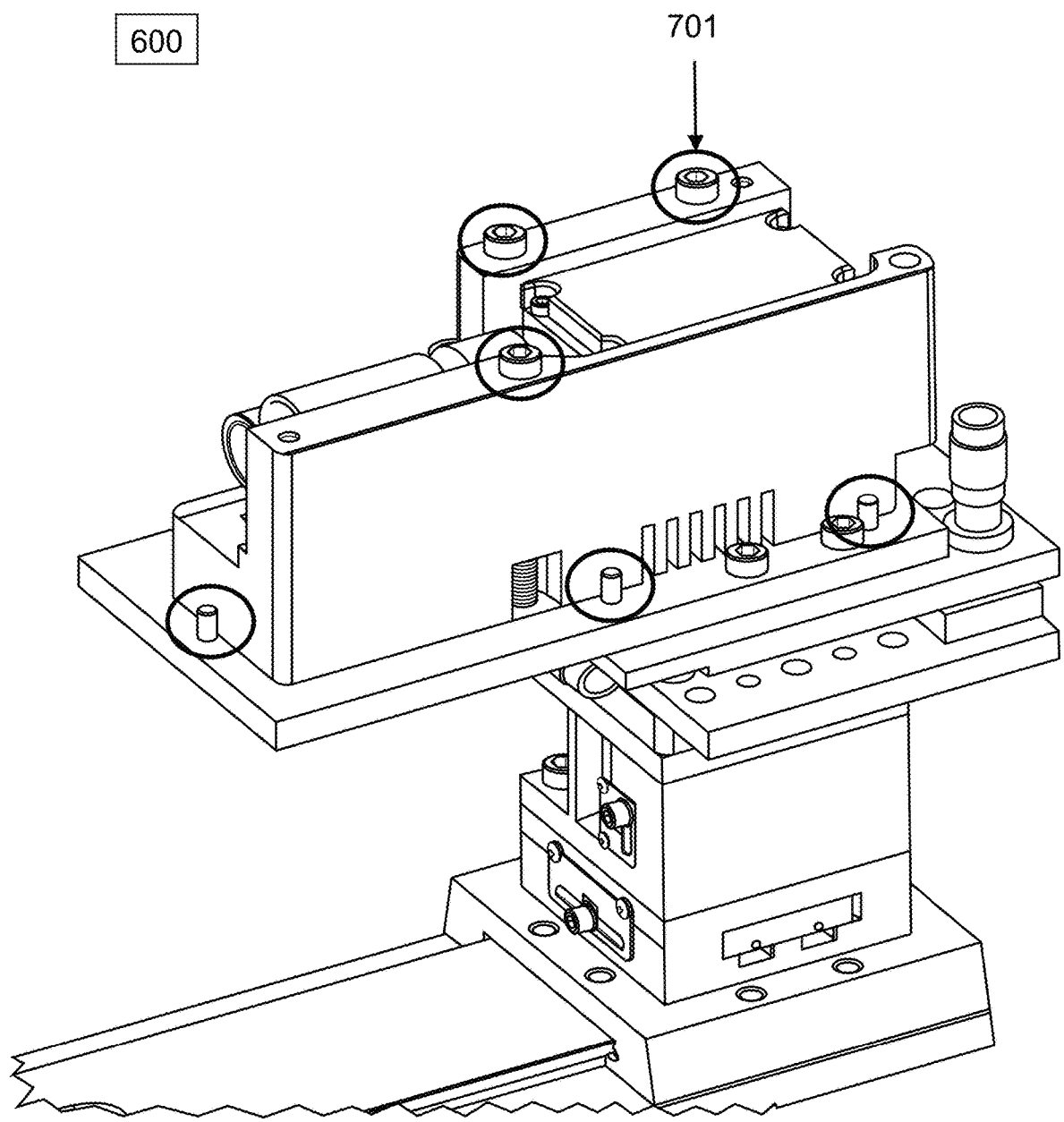
FIG. 7 depict attachment of the heat sink to the first stage according to certain embodiments.

As discussed above, in some embodiments, the subject heat sink is configured to be mounted on the first stage. In such embodiments, the heat sink may be affixed to the first stage. The heat sink may be affixed to the first stage by any convenient mechanism. In some embodiments, the heat sink is affixed to the first stage with one or more sets of screws and washers. For example, FIG. 7 demonstrates how the heat sink may be affixed to the first stage according to an embodiment of the invention. As shown in FIG. 7, the heat sink is secured by a series of screws and washers 701.

Figure 8:
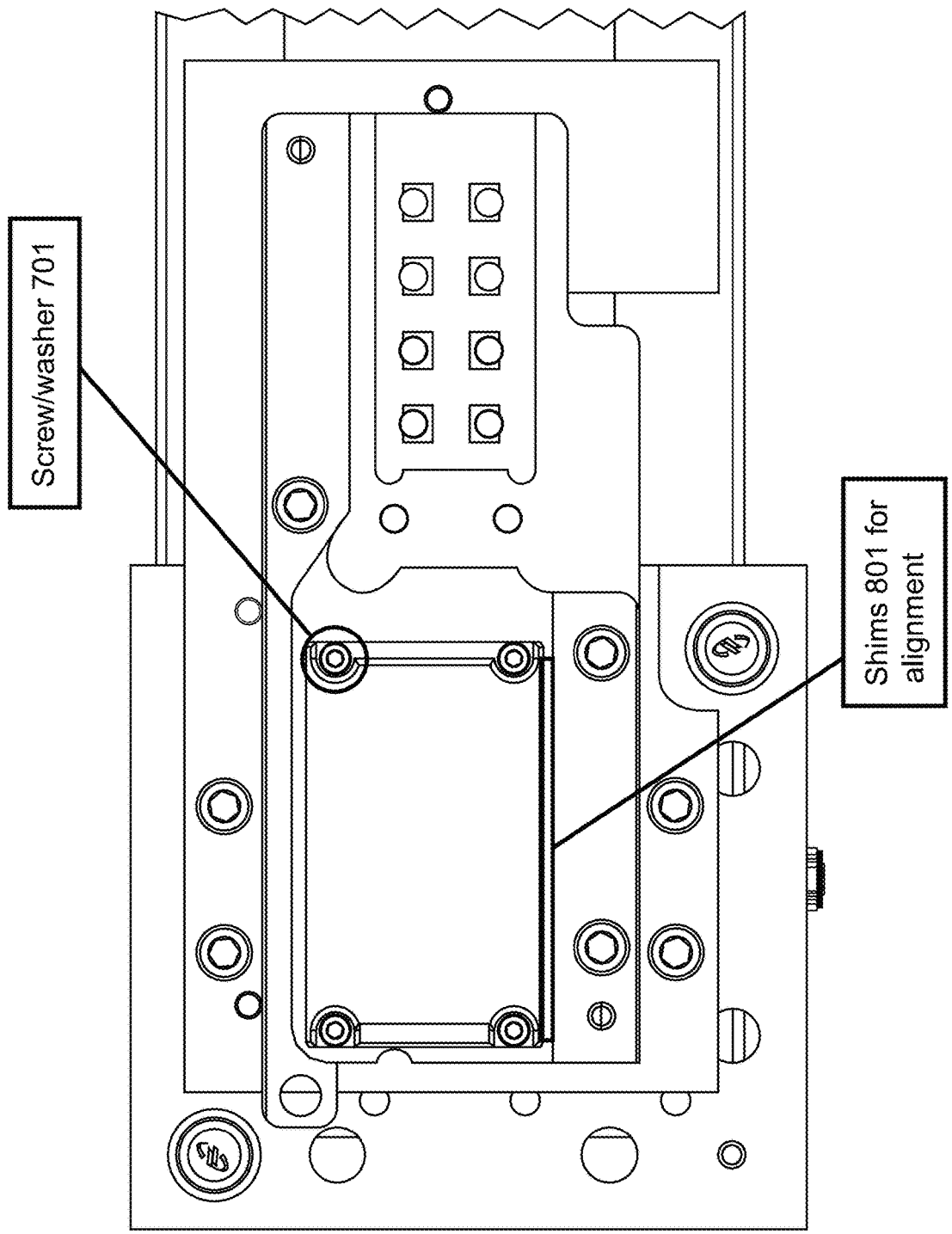
FIG. 8 depicts an alternative view of the heat sink.

In embodiments of the device where the diode laser under investigation is inserted in a heat sink, the device may be adjustable in order to ensure that the diode laser maintains optical alignment with one or more of the beam profiler and any beam shaping optical components placed in the path of the beam. In embodiments where the first stage is adjustable in the x and y directions, optical alignment may be achieved or maintained by adjusting the position of the first stage in the x and y directions such that the heat sink and laser positioned thereon are correspondingly adjusted. In embodiments where the tilt and yaw of the first stage is adjustable, optical alignment may be achieved or maintained by adjusting tilt and yaw of the first stage such that the heat sink and laser positioned thereon are correspondingly adjusted. In still further embodiments, maintaining optical alignment includes adding or removing shims configured to incrementally alter the position of the laser. For example, FIG. 8 depicts the heat sink affixed to the first stage as viewed from above. As shown in FIG. 8, shims may be inserted to the heat sink to alter the position of the laser contained therein as desired (e.g., to ensure suitable optical alignment with the beam profiler).

Figure 9:
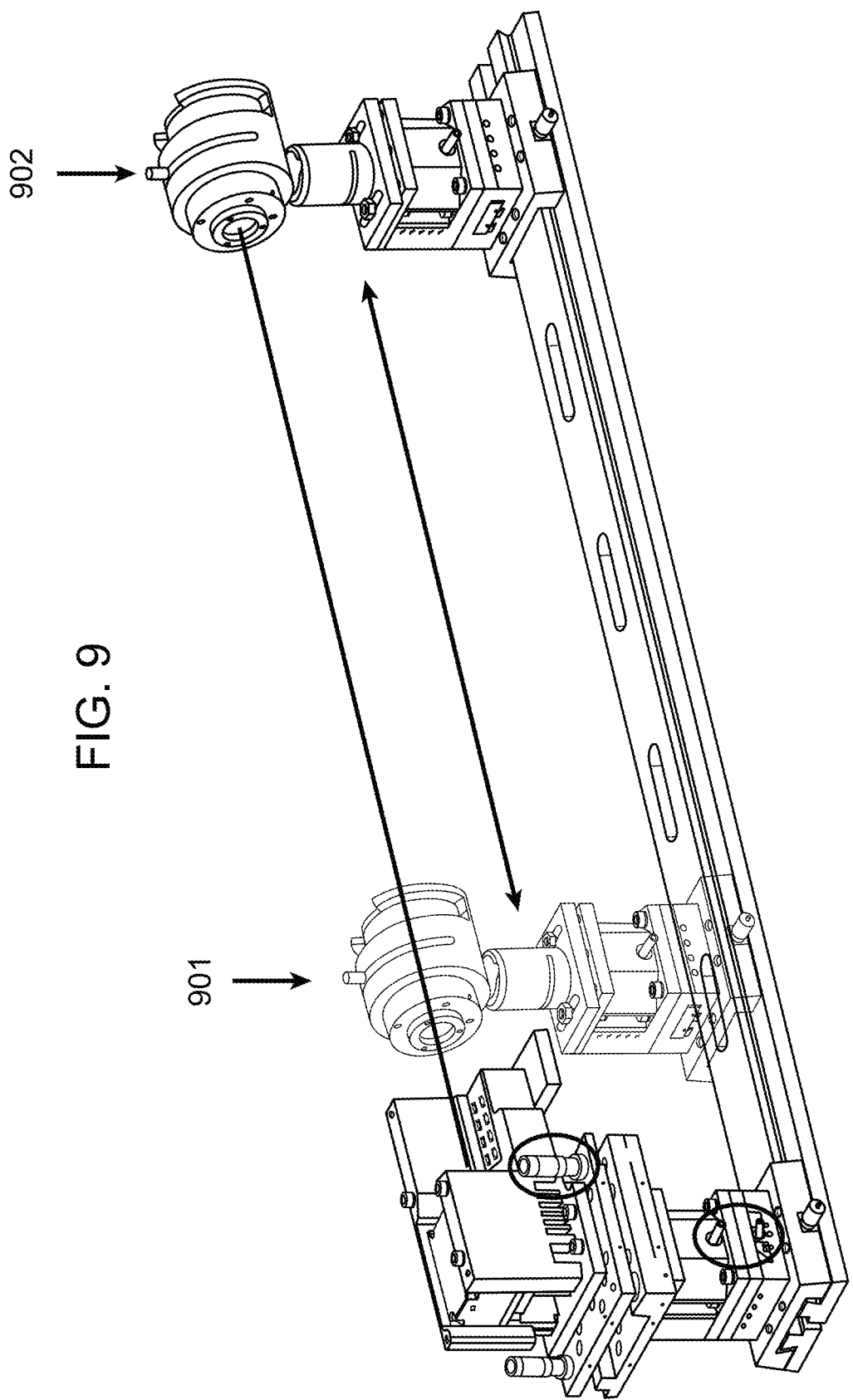
FIG. 9 depicts a device transitioning between a near field configuration and a far field configuration.

Optical alignment of the laser and beam profiler may involve adjusting the position of the laser (or the heat sink in which the laser is placed), adjusting the position of the beam profiler, or both. In embodiments, beam output may be aligned by adjusting the horizontal (X)/vertical (Y) adjustment micrometers of the beam profiler to center (e.g., x, y centroids=4500 μm) in the beam profiler software. In some embodiments, the x and y positions of the second stage may be adjusted when the beam profiler is near field. In additional embodiments, the tilt and yaw of the first stage may be adjusted when beam profiler is far field. "Near field" and "far field" are terms that indicate the positioning of the beam profiler relative to the diode laser. A diode laser and beam profiler may be in a near field relationship if the components are in relatively close proximity along the rail, while the same diode laser and beam profile may be in a far field relationship of the components are located farther apart along the rail. In some embodiments, the near field configuration is one in which the beam profiler is located approximately 700 mm from the laser. In some embodiments, the far field configuration of the device is one in which both the first stage and the second stage are placed at ends of the rail. For example, FIG. 9 depicts the device transitioning between a near field configuration 901 and a far field configuration 902. The device may be configured such that diode laser evaluation occurs at both near field and far field configurations in order to measure laser beam properties at multiple locations along the length of the beam.

Figure 10:
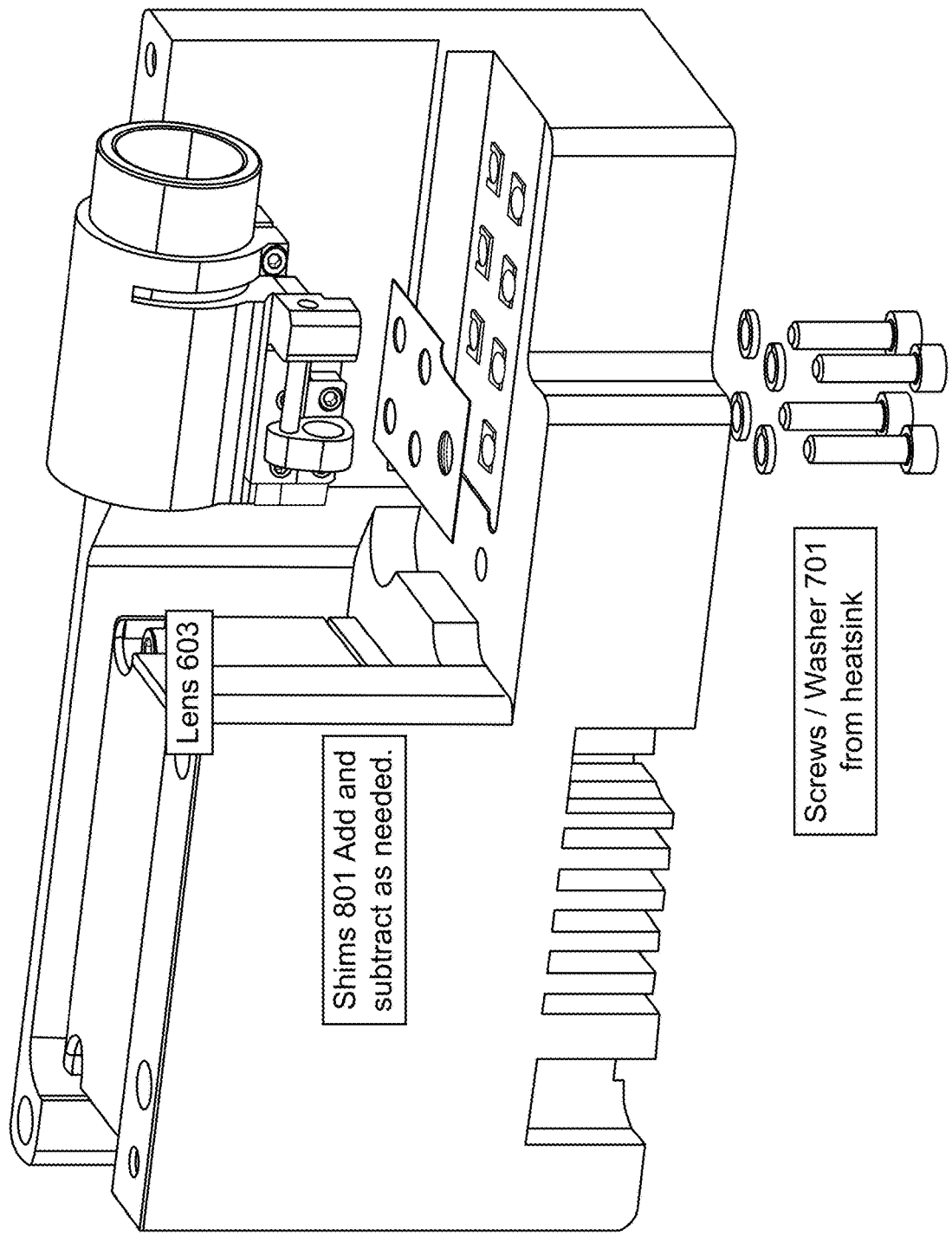
FIG. 10 depicts the adjustment of a beam shaping optical component according to one embodiment.
Figure 11:
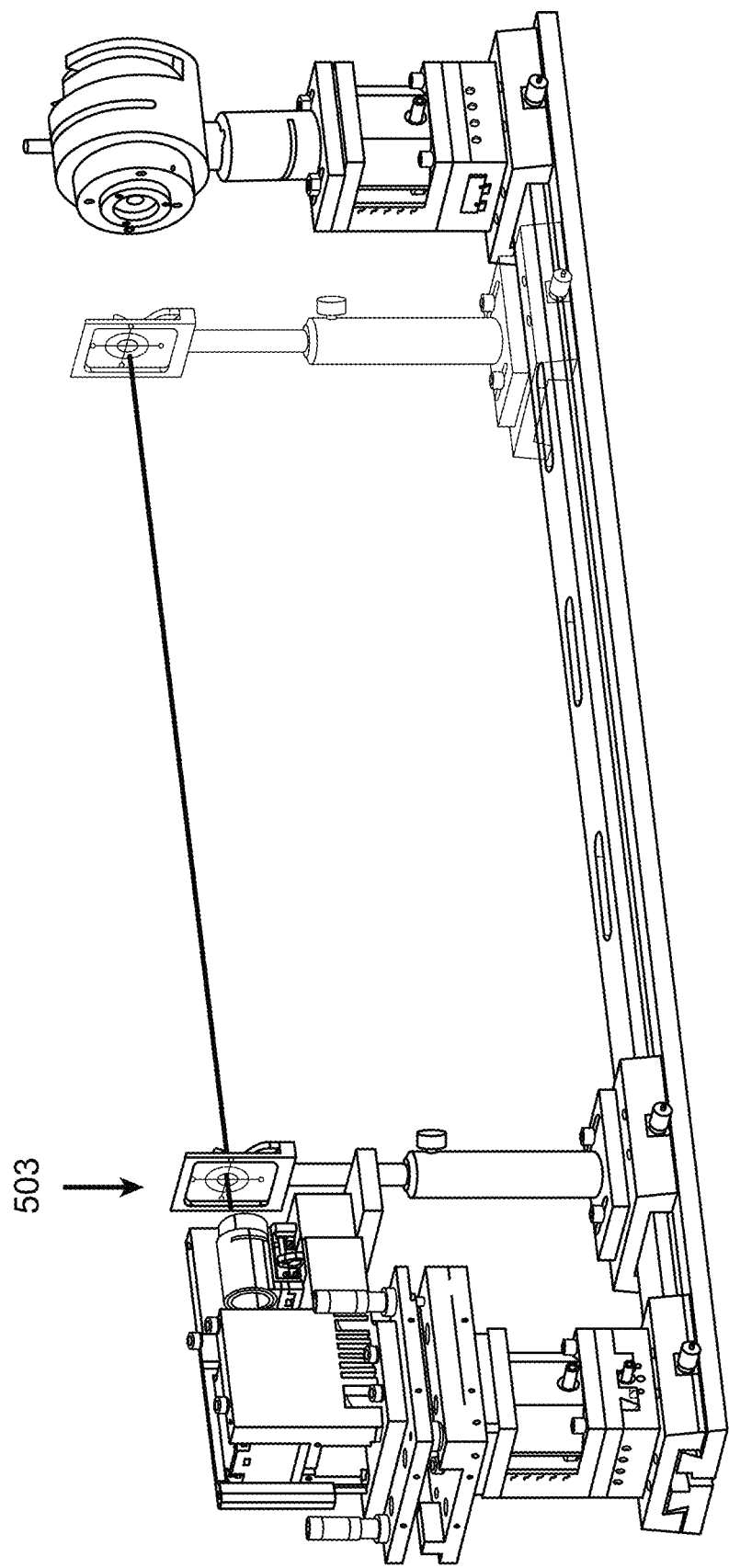
FIG. 11 depicts a target for optically aligning the diode laser and beam profiler according to one embodiment.

In additional embodiments, the device may be configured such that beam shaping optical components are introduced into the device and subsequently optically aligned with the laser and/or beam profiler, i.e., so that the diode laser is evaluated in conjunction with said beam shaping optical component. In such embodiments, the beam shaping optical component may be adjusted to ensure proper alignment. In some embodiments, the device is configured so that shims may be introduced such that the positioning of the beam shaping optical device is incrementally adjusted. For example, FIG. 10 demonstrates how lens 603 is adjusted by the placement of shims 801 that may be added and subtracted as needed so that the laser beam passing through lens 603 remains optically aligned with the beam profiler. In addition, FIG. 11 demonstrates how the optical alignment of the above components may be assessed using target 503 discussed above. As shown in FIG. 11, target 503 may be attached to the rail such that it is slidable thereon. By sliding target 503 along the rail, it can be determined by observing the location of the laser beam relative to the crosshairs on the target if the laser beam deviates from an intended optical axis, i.e., one that is optically aligned with the beam profiler.

Figure 12:
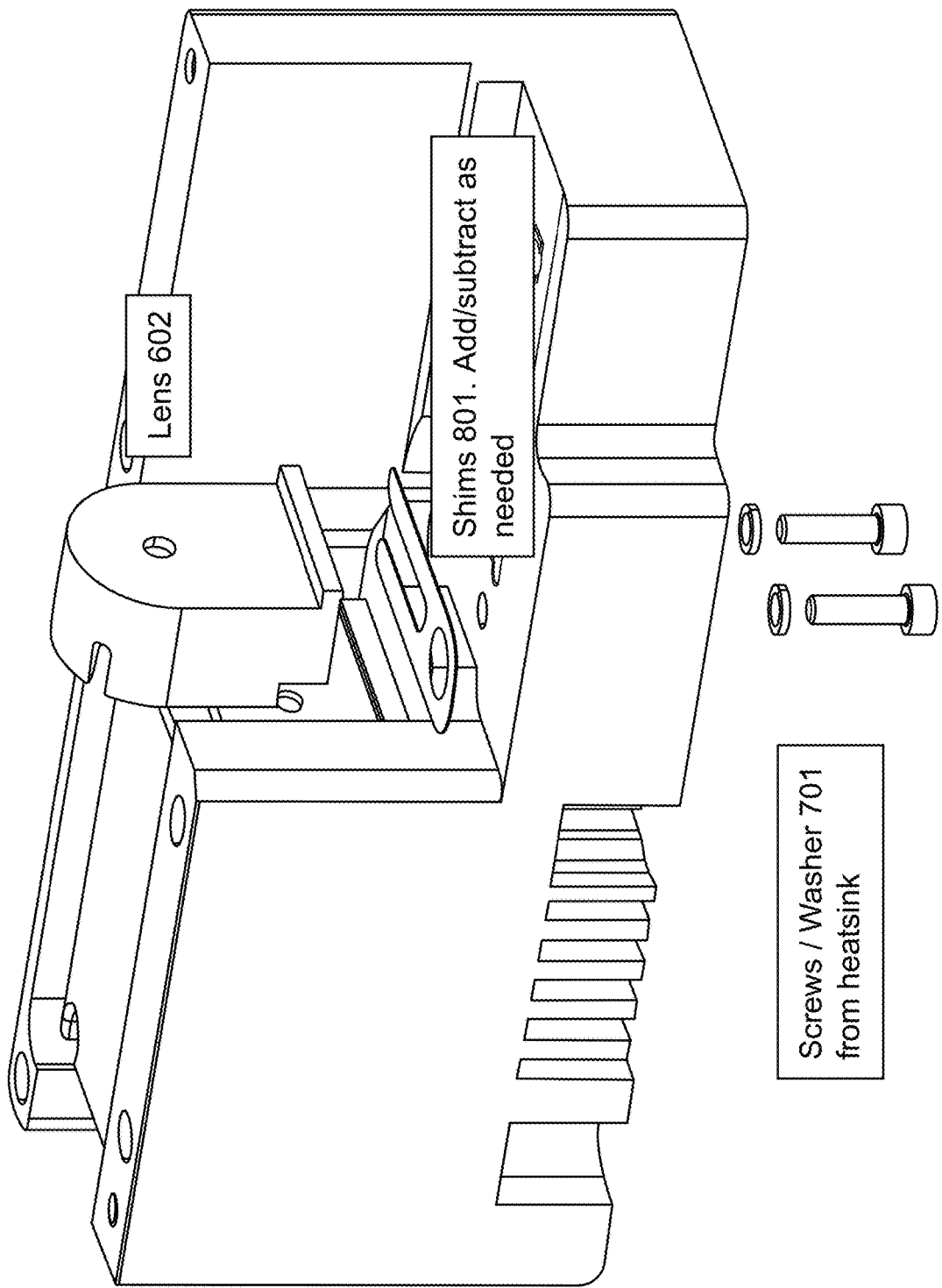
FIG. 12 depicts the adjustment of a beam shaping optical component according to one embodiment.
Figure 13:
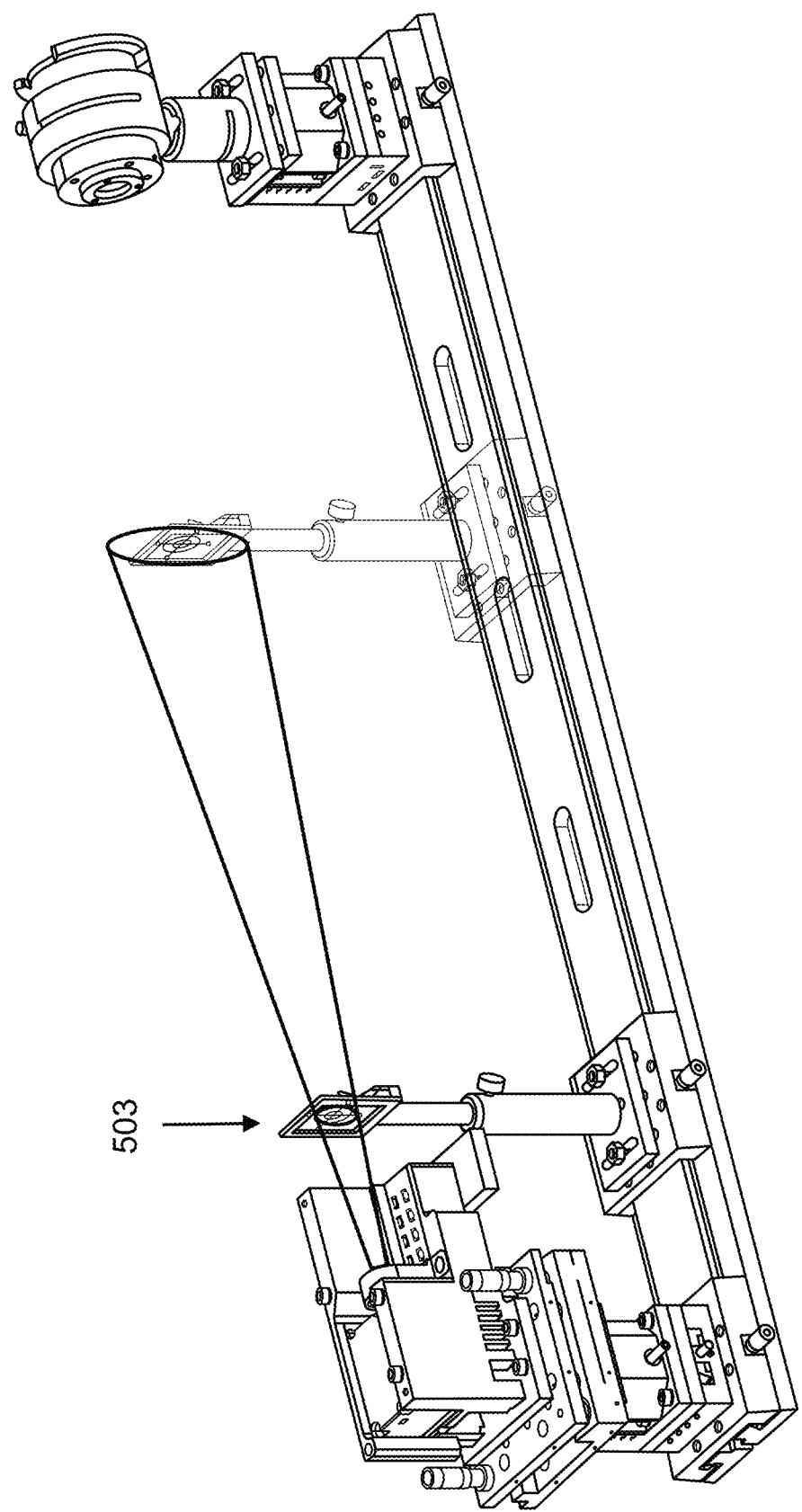
FIG. 13 depicts a target for optically aligning the diode laser and beam profiler according to one embodiment.

Furthermore, in embodiments of the invention where more than one beam shaping optical component is placed between the laser and the beam profiler, the instant device may be configured such that the additional beam shaping optical component(s) are adjusted to ensure optical alignment between the laser and the beam profiler. In certain embodiments, the device is configured so that shims may be introduced such that the positioning of the beam shaping optical device is incrementally adjusted. In some embodiments, adjustment of a second beam shaping optical component may be performed concurrently with the adjustment of the first beam shaping optical component. In other embodiments, the first beam shaping optical component is adjusted to ensure optical alignment, and the second beam shaping optical component is introduced after the first beam shaping optical component has been adjusted. For example, FIG. 12 demonstrates how lens 602 is adjusted by the placement of shims 801 that may be added and subtracted as needed so that the laser beam passing through lens 602 remains optically aligned with the beam profiler. In addition, FIG. 13 demonstrates how the optical alignment of the above components may be assessed using target 503 discussed above. As shown in FIG. 13, target 503 may be attached to the rail such that it is slidable thereon. By sliding target 503 along the rail, it can be determined by observing the location of the laser beam relative to the crosshairs on the target if the laser beam deviates from an intended optical axis, i.e., one that is optically aligned with the beam profiler.

Figure 14A:
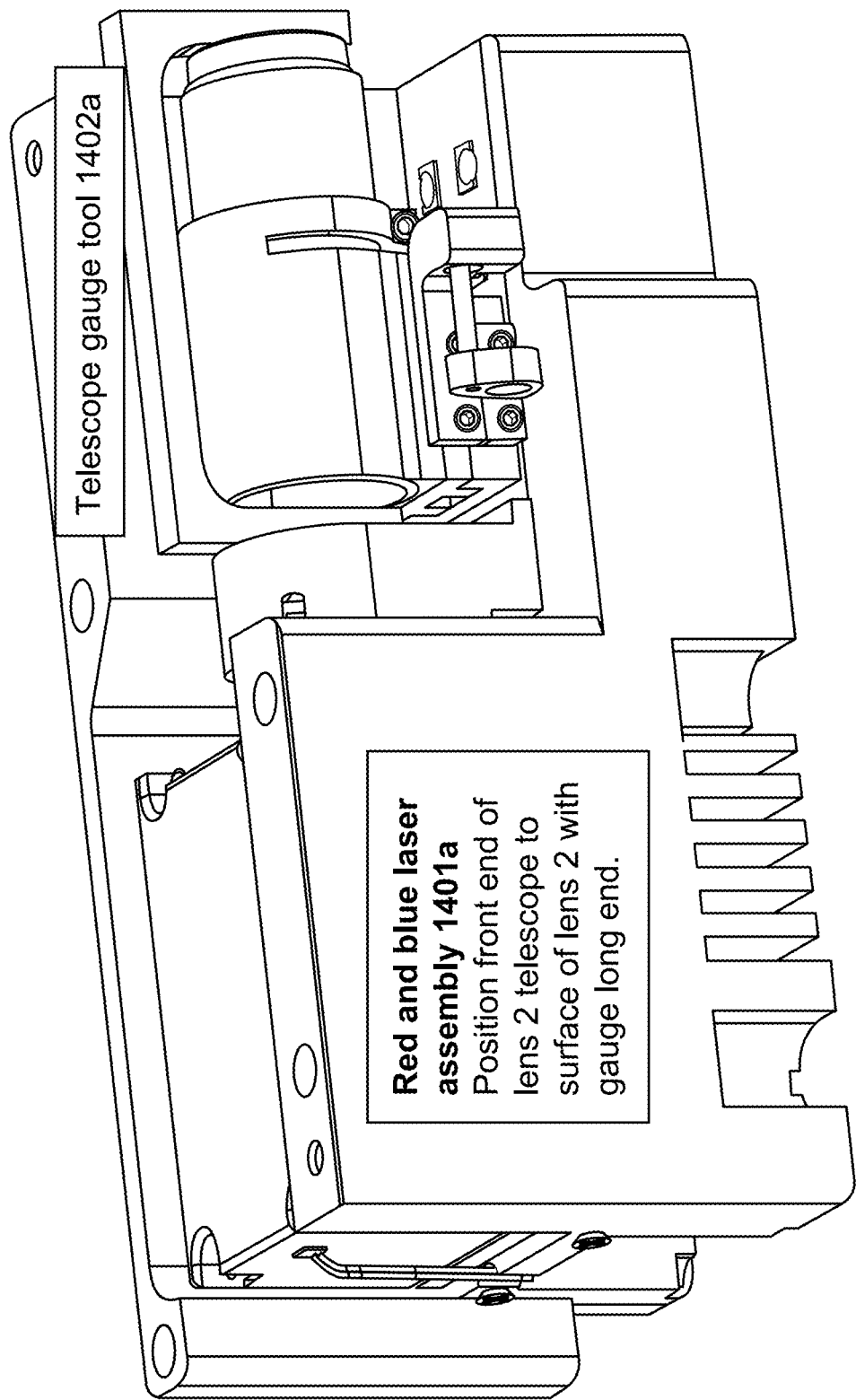
FIG. 14A-B depict heat sinks configured to receive different sizes of beam shaping optical components.
Figure 14B:
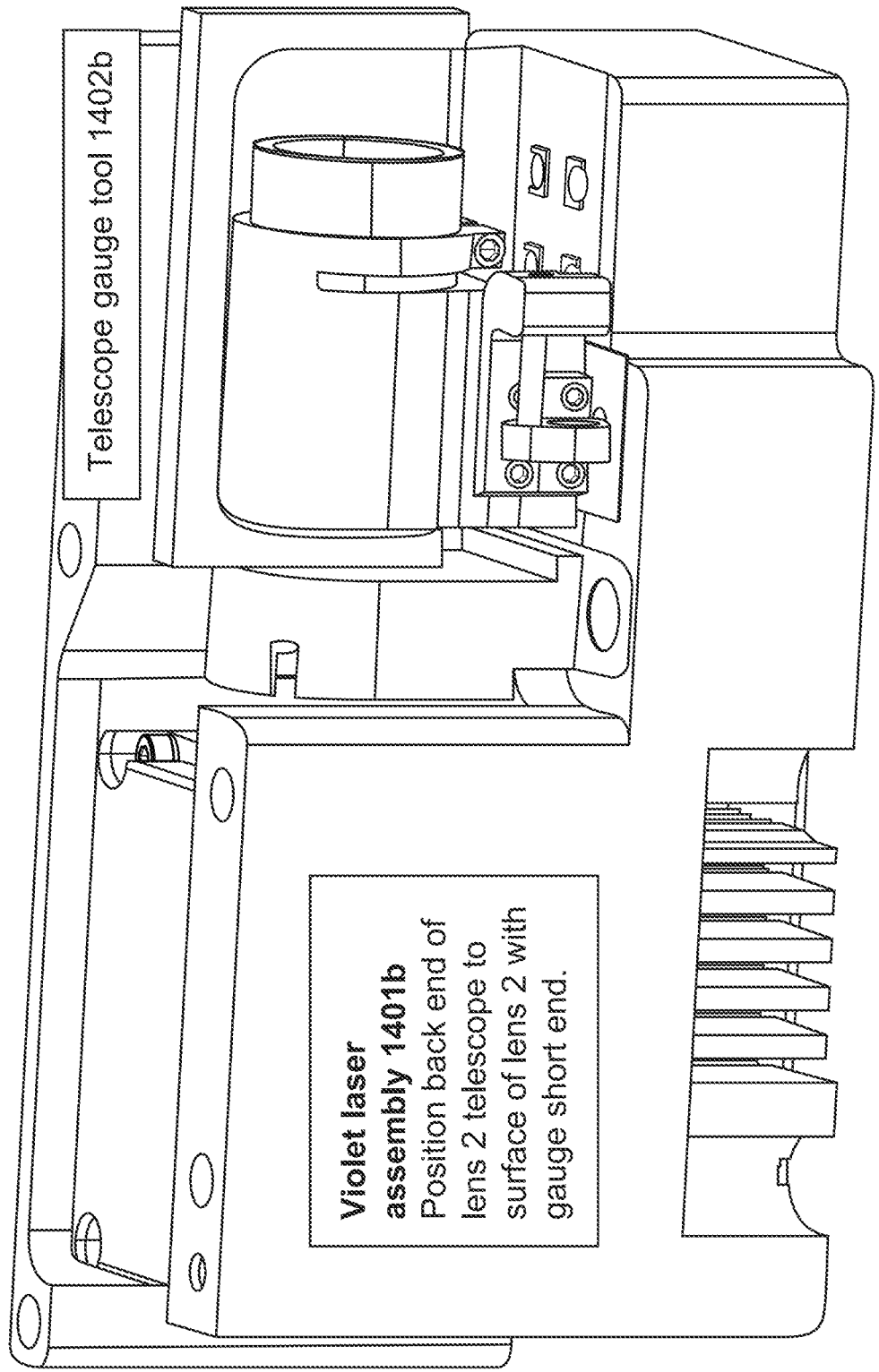

FIG. 14A-B depicts how the device (e.g., the heat sink) may be configured to receive multiple different types of beam shaping optical components. For example, where one of the beam shaping optical components is a telescoping gauge tool, the heat sink is configured to accommodate different sizes of the telescoping gauge tool that may be required based on the type of diode laser being evaluated. FIG. 14A depicts a heat sink including a red/blue diode laser 1401a, and a telescoping gauge tool 1402a. FIG. 14B depicts a heat sink including a violet laser 1401b, and a telescoping gauge tool 1402b. As shown in the comparison between FIG. 14A and FIG. 14B, the telescoping gauge tool 1402a associated with the red/blue laser 1401a is longer than the telescoping gauge 1402b tool associated with the violet laser 1401b.

In an alternative embodiment of the device, optical alignment between components of the device (e.g., diode laser, beam shaping optical component(s), beam profiler) is carried out by a reference laser. In such embodiments, the reference laser may be fixed in a position that is known to result in optical alignment with the beam profiler. In other words, while the reference laser is not evaluated by the beam profiler, it may be employed to optically align components necessary for the evaluation of the diode laser of interest. In embodiment, the reference laser is located on a stage capable of being adjusted in the x and y directions. In additional embodiments, the tilt and yaw of the reference laser stage is adjustable.

In embodiments of the device including a reference laser, the device may further include a camera for optically aligning the reference laser and the beam profiler. In additional embodiments, the camera may be used for optically aligning a beam shaping optical component, and is affixed to a stage that is adjustable in the x and y directions. In certain embodiments, the beam shaping optical component aligned by the camera and the reference laser is a final focus lens assembly. In embodiments, the final focus lens assembly includes at least one transmissive optical element having at least one curved surface (i.e., lens) through which light beam travels and is configured to focus the amplified light beam at a focal location (i.e., the beam profiler). In further embodiments, the final focus lens assembly is affixed to a stage that is adjustable in the x and y directions. In embodiments, after aligning the final focus lens assembly via the reference laser and the camera, the diode laser being evaluated is affixed to the first stage and subsequently evaluated by the beam profiler.

Figure 15:
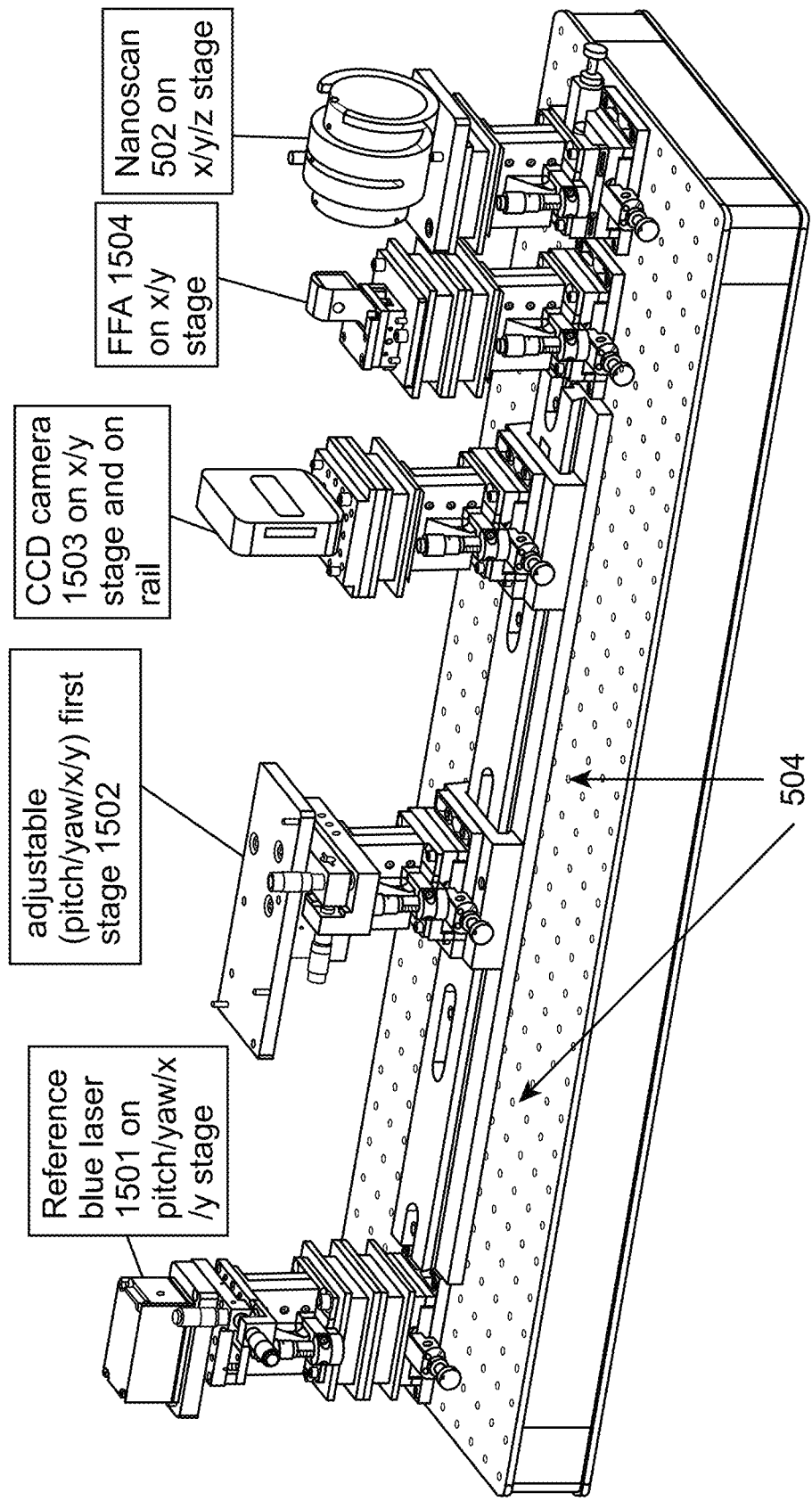
FIG. 15 depicts a device for evaluating diode laser performance according to certain embodiments.

For example, FIG. 15 depicts an embodiment of the device. As shown in FIG. 15, the reference laser 1501 is located at one end of the rail 504. Also included are a first stage 1502, a CCD camera 1503, a final focus lens assembly 1504 (FFA) and detector 502. The reference laser may be used to align the optical components of the device before the diode laser under evaluation is affixed to first stage.

In additional embodiments, the subject devices include a processor operably connected to the beam profiler comprising memory operably coupled to the processor wherein the memory comprises instructions stored thereon, which when executed by the processor, cause the processor to evaluate the diode laser. In such embodiments, after the laser beam profile is received by the processor, the processor may be configured to determine a first laser beam width at a first laser intensity. As is known in the art, laser intensity may vary along different points along the width of the beam. As such, determining a first laser beam width at a first laser intensity includes obtaining the beam width associated with a given first laser intensity. In some instances, the first laser intensity is a fixed value chosen by a user. In other embodiments, the first laser intensity is defined as a percentage of the peak laser intensity observed in the laser profile. In such embodiments, the first laser intensity is 2% of the peak laser intensity. Accordingly, in some embodiments, determining a first laser beam width at a first laser intensity includes obtaining the peak laser intensity from the laser beam profile, computing the value of 2% of said peak laser intensity (i.e., the first laser intensity), and ascertaining the beam width at which the first laser intensity was observed.

In embodiments, the processor may be further configured to calculate a second laser beam width at a second laser intensity. In some embodiments, determining a second laser beam width at a second laser intensity includes obtaining the beam width associated with a given second laser intensity. In some instances, the second laser intensity is a fixed value chosen by a user. In other embodiments, the second laser intensity is defined as a percentage of the peak laser intensity observed in the laser profile. In such embodiments, the second laser intensity is 13.5% of the peak laser intensity. Accordingly, in some embodiments, determining a second laser beam width at a second laser intensity includes obtaining the peak laser intensity from the laser beam profile, computing the value of 13.5% of said peak laser intensity (i.e., the second laser intensity), and ascertaining the beam width at which the second laser intensity was observed.

In embodiments, the processor may be further configured to calculate a third laser beam width at a third laser intensity. In some embodiments, determining a third laser beam width at a third laser intensity includes obtaining the beam width associated with a given third laser intensity. In some instances, the third laser intensity is a fixed value chosen by a user. In other embodiments, the third laser intensity is defined as a percentage of the peak laser intensity observed in the laser profile. In such embodiments, the third laser intensity is 90% of the peak laser intensity. Accordingly, in some embodiments, determining a third laser beam width at a third laser intensity includes obtaining the peak laser intensity from the laser beam profile, computing the value of 90% of said peak laser intensity (i.e., the third laser intensity), and ascertaining the beam width at which the third laser intensity was observed.

After first, second and third laser beam widths have been determined at first, second and third laser intensities, respectively, the processor may be configured to compute a first ratio. In embodiments, the first ratio is computed between the second beam width determined at the second laser intensity, and the third laser beam width determined at the third laser intensity. In embodiments, computation of the first ratio produces a dimensionless number, the magnitude of which provides a measure of laser beam profile deviation from a pure Gaussian beam shape.

In embodiments, the processor may also be configured to compute a second ratio. In embodiments, the second ratio is computed between the first laser beam width determined at the first laser intensity, and the second laser beam width determined at the second laser intensity. In embodiments, computation of the second ratio produces a dimensionless number, the magnitude of which, in addition to the first ratio, provides a measure of laser beam profile deviation from a pure Gaussian beam shape.

In some embodiments, the processor is configured to evaluate diode laser performance based on the computed first and second ratios. In such embodiments, evaluating diode laser performance may include assessing the extent to which the laser profile deviates from a Gaussian beam shape. In an ideal Gaussian beam (i.e., a beam producing a laser profile following a Gaussian distribution), a laser beam profile can be described with a Gaussian function defined by Equation 1:

$$I(r) = I_0 \exp\left(\frac{-2r^2}{w(z)^2}\right) = \frac{2P}{\pi w(z)^2} \exp\left(\frac{-2r^2}{w(z)^2}\right)$$

As shown above, $I_0$ is the peak laser intensity at the center of the laser beam, r is the radial distance away from the axis, w(z) is the radius of the laser beam where the irradiance is $1/e^2$ (13.5%) of $I_0$, z is the axial distance from the beam waist, and P is the total power of the beam. Accordingly, in some instances, evaluating diode laser performance includes evaluating the magnitude of a laser beam profile's deviation from a pure Gaussian profile (e.g., as defined by Equation 1). In such instances, a large value computed for the first ratio is indicative of a deviation from Gaussian beam shape. Similarly, in some embodiments, a large value calculated for the second ratio is indicative of a deviation from a Gaussian beam shape. Therefore, in embodiments, the magnitude of the first and/or second ratio is proportional to the amount a particular portion of a laser beam profile deviates from an ideal Gaussian shape.

In additional embodiments, the processor evaluates laser performance by determining the manner in which a laser beam profile deviates from ideal beam shape, i.e., identifying whether a certain subtype of deviation is present in the laser beam profile. For example, in some embodiments, assessing the extent to which the laser beam profile deviates from a Gaussian beam shape comprises identifying whether multiple modes are present in the laser beam profile. As is known in the art of laser optics, a laser beam profile exhibits multiple modes when self-consistent distributions are observed in laser light. Different types of modes can be produced depending on the configuration of the laser resonator. In some instances, the laser beam is characterized as a Laguerre-Gaussian beam in which cylindrical higher-order modes are present. In other instances, the laser beam is characterized as a Hermite-Gaussian beam in which rectangular higher-order modes are present. In some embodiments, identifying whether multiple modes are present in the laser beam profile includes the observation of a large value obtained for the first ratio. In other embodiments, identifying whether multiple modes are present in the laser beam profile includes the observation of a of a large value obtained for the second ratio. In still other embodiments, identifying whether multiple modes are present in the laser beam profile includes the observation of a large value obtained for both the first and the second ratio.

In some embodiments, assessing the extent to which the laser beam profile deviates from a Gaussian beam shape comprises identifying whether a wide bottom is present in the laser beam profile. As discussed herein, a laser beam profile exhibits a wide bottom when the graph resulting from laser intensity being plotted as a function of position possesses a deviation from pure Gaussian beam shape such that one or more tails of the curve encompass a disproportionately large area relative to the remainder of the curve (i.e., when the area under the curve is calculated via integration) than would be expected assuming a pure Gaussian beam shape. In some embodiments, identifying whether a wide bottom is present in the laser beam profile includes the observation of a large value obtained for the second ratio. In such embodiments, the presence of a wide bottom in the laser beam profile will lead to values computed for the second ratio that are outside of parameters that would normally be indicative of a Gaussian beam shape. In some instances where such values are computed for the second ratio, a determination is made indicating that the diode laser being evaluated is not suitable for use in the setting of interest, e.g., a flow cytometry setting.

In embodiments, assessing the extent to which the laser beam profile deviates from a Gaussian beam shape comprises identifying whether a narrow peak is present in the laser beam profile. As discussed herein, laser beam profile exhibits a narrow peak when the graph resulting from laser intensity being plotted as a function of position possesses a deviation from pure Gaussian beam shape such that the peak of the curve possesses a disproportionately small area relative to the remainder of the curve (i.e., when the area under the curve is calculated via integration) than would be expected assuming a pure Gaussian beam shape. In some embodiments, identifying whether a narrow peak is present in the laser beam profile includes the observation of a large value obtained for the first ratio. In such embodiments, the presence of a narrow peak in the laser beam profile will lead to values computed for the first ratio that are outside of parameters that would normally be indicative of a Gaussian beam shape. In some instances where such values are computed for the first ratio, a determination is made indicating that the diode laser being evaluated is not suitable for use in the setting of interest, e.g., a flow cytometry setting.

In some embodiments, assessing the extent to which the laser beam profile deviates from a Gaussian beam shape comprises identifying whether a sidelobe pattern is present in the laser beam profile. In some embodiments, a sidelobe pattern may involve a beam shape containing one or more intensity sub-maxima in addition to the central peak. In some embodiments, identifying whether a sidelobe pattern is present in the laser beam profile includes the observation of a large value obtained for the first ratio. In other embodiments, identifying whether a sidelobe pattern is present in the laser beam profile includes the observation of a of a large value obtained for the second ratio. In still other embodiments, identifying whether a sidelobe pattern is present in the laser beam profile includes the observation of a large value obtained for both the first and the second ratio. In embodiments, the presence of a sidelobe pattern in the laser beam profile will lead to values computed for the first and/or second ratio that are outside of parameters that would normally be indicative of a Gaussian beam shape. In some instances where such values are computed for the first and/or second ratio, a determination is made indicating that the diode laser being evaluated is not suitable for use in the setting of interest, e.g., a flow cytometry setting.

In some embodiments, the processor is configured to evaluate laser performance with respect to each of a horizontal laser beam profile and a vertical laser beam profile. As is known in the art, a laser beam may be analyzed with respect to both horizontal and vertical cross-sections. As such, in some embodiments, the laser beam profile may include a horizontal laser beam profile and a vertical laser beam profile in which the laser beam is characterized with respect to the vertical cross-section and horizontal cross-section, respectively. Evaluating laser performance with respect to each of the horizontal laser beam profile and the vertical laser beam profile may therefore include performing the evaluation steps described above for each of the horizontal and vertical profiles. For example, in some embodiments, a first and second ratio (calculated as described above) may be computed with respect to the horizontal direction, and separate set of first and second ratios may be computed for the vertical direction. In some instances, analysis of the first and second ratios (e.g., as described above) may indicate that the laser beam of interest diverges from Gaussian beam shape in the horizontal direction, but exhibits Gaussian beam shape in the vertical direction, or vice versa.

As discussed above, in embodiments, evaluating diode laser performance with respect to each of the horizontal and vertical directions includes determining the suitability of the diode laser for use in a particular setting, e.g., a flow cytometry setting. For example, in standard laser geometry when the diode laser slow axis (i.e., light encountering a higher index of refraction) corresponds to the flow cell's horizontal direction, the non-Gaussian laser profile observed at the focusing plane where the laser beam intersects the flow stream (i.e., of a flow cytometer) would directly cause failing or high CV with characteristically high first and second ratios compared to pure horizontal Gaussian profile. In some cases when the diode orientation is rotated by 90 degrees, with the slow axis corresponding to the flow cell vertical direction, strong sidelobes and a wide bottom observed in the vertical direction of the non-Gaussian beam profile would result in high abort rates (i.e., an event in flow cytometry not being counted) and failing area scaling factor (i.e., where a flow instrument is not able to properly calculate the area of the pulse it measures) with typically high first and second ratios compared to pure vertical Gaussian profile. As such, when the diode laser is evaluated with respect to each of the horizontal and vertical directions, high values obtained for the first and second ratios are predictive of negative outcomes (e.g., failing/high CV, abort rates, failing area scaling factor) should that laser be employed in flow cytometry experiments. Accordingly, in embodiments, the values obtained for the first and second ratios evaluated with respect to each of the horizontal and vertical laser profiles may serve as a basis for outputting a determination regarding the suitability of the diode laser for use in a flow cytometry setting.

The processor may be further configured to generate and output a determination regarding the suitability of a particular laser for use in a particular setting, e.g., a flow cytometry setting. In some embodiments, the determination is a binary determination. In such embodiments, the determination may indicate that the diode laser either is or is not suitable for use in the setting of interest. In other embodiments, the determination is one of multiple possible determinations existing along a continuum from not suitable to suitable. In such embodiments, intermediate determinations may be outputted that qualitatively indicate the performance of the laser, i.e., a given diode laser may be more or less suitable for use in a particular setting (e.g., a flow cytometry setting) than another laser.

Flow Cytometers

Aspects of the invention further include flow cytometers incorporating an evaluated diode laser, and methods of assembling such flow cytometers. In embodiments, the subject flow cytometers include a flow cell, and a diode laser configured to irradiate the flow cell. In such embodiments, the diode laser has been evaluated by a method that includes receiving a laser beam profile of the diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting. In certain embodiments, diode lasers that have received a favorable determination regarding the suitability of the laser for use in a flow cytometry setting following the evaluation of laser performance based on the first and second ratios are incorporated in the subject flow cytometers.

Aspects of the flow cytometers also include a forward scatter detector configured to detect forward scattered light. The number of forward scatter detectors in the subject flow cytometers may vary, as desired. For example, the subject flow cytometers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the flow cytometers include multiple forward scatter detectors, each detector may be the same, or the collection of detectors may be a combination of different types of detectors. For example, where the subject flow cytometers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple side scatter detectors, each side scatter detector may be the same, or the collection of side scatter detectors may be a combination of different types of detectors. For example, where the subject flow cytometers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol,* 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 16:
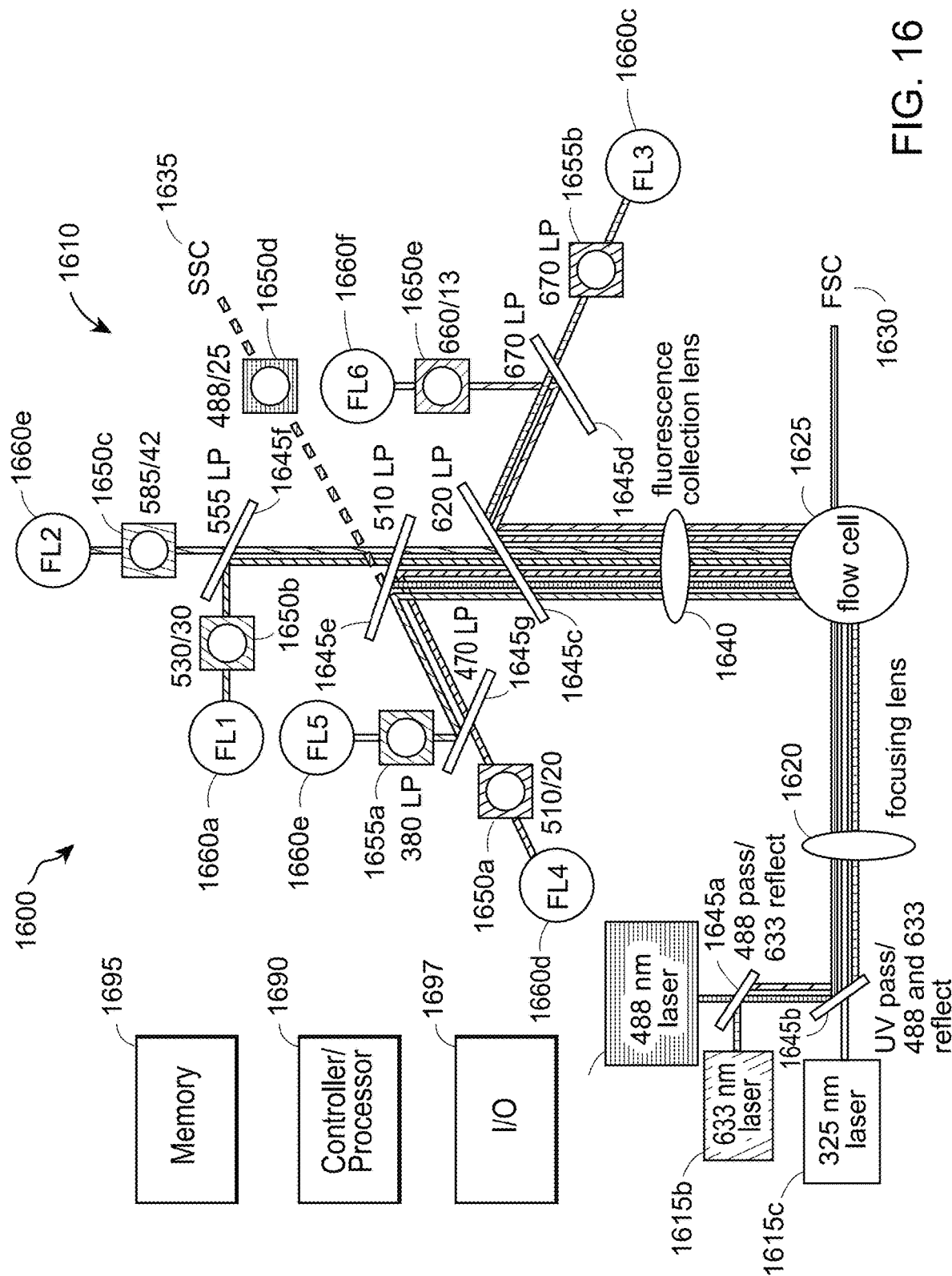
FIG. 16 depicts a flow cytometer according to certain embodiments.

FIG. 16 shows a system 1600 for flow cytometry in accordance with an illustrative embodiment of the present invention. The system 1600 includes a flow cytometer 1610, a controller/processor 1690 and a memory 1695. The flow cytometer 1610 includes one or more excitation lasers 1615a-1615c, a focusing lens 1620, a flow chamber 1625, a forward scatter detector 1630, a side scatter detector 1635, a fluorescence collection lens 1640, one or more beam splitters 1645a-1645g, one or more bandpass filters 1650a-1650e, one or more longpass ("LP") filters 1655a-1655b, and one or more fluorescent light detectors 1660a-1660f.

The excitation lasers 1615a-c emit light in the form of a laser beam. The wavelengths of the laser beams emitted from excitation lasers 1615a-1615c are 488 nm, 633 nm, and 325 nm, respectively, in the example system of FIG. 16. The laser beams are first directed through one or more of beam splitters 1645a and 1645b. Beam splitter 1645a transmits light at 488 nm and reflects light at 633 nm. Beam splitter 1645b transmits UV light (light with a wavelength in the range of 10 to 400 nm) and reflects light at 488 nm and 633 nm.

The laser beams are then directed to a focusing lens 1620, which focuses the beams onto the portion of a fluid stream where particles of a sample are located, within the flow chamber 1625. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 1630, side scatter detector 1635, and the one or more fluorescent light detectors 1660a-1660f through one or more of the beam splitters 1645a-1645g, the bandpass filters 1650a-1650e, the longpass filters 1655a-1655b, and the fluorescence collection lens 1640.

The fluorescence collection lens 1640 collects light emitted from the particle-laser beam interaction and routes that light towards one or more beam splitters and filters. Bandpass filters, such as bandpass filters 1650a-1650e, allow a narrow range of wavelengths to pass through the filter. For example, bandpass filter 1650*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 1655*a*-1655*b*, transmit wavelengths of light equal to or longer than a specified wavelength of light. For example, longpass filter 1655*a*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 1605*g* is a 620 SP beam splitter, meaning that the beam splitter 1645*g* transmits wavelengths of light that are 620 nm or shorter and reflects wavelengths of light that are longer than 620 nm in a different direction. In one embodiment, the beam splitters 1645*a*-1645*g* can comprise optical mirrors, such as dichroic mirrors.

The forward scatter detector 1630 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 1635 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 1660*a*-1660*f*. The side scatter detector 1635 and fluorescent light detectors can include photomultiplier tubes. The signals detected at the forward scatter detector 1630, the side scatter detector 1635 and the fluorescent detectors can be converted to electronic signals (voltages) by the detectors. This data can provide information about the sample.

In operation, cytometer operation is controlled by a controller/processor 1690, and the measurement data from the detectors can be stored in the memory 1695 and processed by the controller/processor 1690. Although not shown explicitly, the controller/processor 1690 is coupled to the detectors to receive the output signals therefrom, and may also be coupled to electrical and electromechanical components of the flow cytometer 1600 to control the lasers, fluid flow parameters, and the like. Input/output (I/O) capabilities 1697 may be provided also in the system. The memory 1695, controller/processor 1690, and I/O 1697 may be entirely provided as an integral part of the flow cytometer 1610. In such an embodiment, a display may also form part of the I/O capabilities 1697 for presenting experimental data to users of the cytometer 1600. Alternatively, some or all of the memory 1695 and controller/processor 1690 and I/O capabilities may be part of one or more external devices such as a general purpose computer. In some embodiments, some or all of the memory 1695 and controller/processor 1690 can be in wireless or wired communication with the cytometer 1610. The controller/processor 1690 in conjunction with the memory 1695 and the I/O 1697 can be configured to perform various functions related to the preparation and analysis of a flow cytometer experiment.

The system illustrated in FIG. 16 includes six different detectors that detect fluorescent light in six different wavelength bands (which may be referred to herein as a "filter window" for a given detector) as defined by the configuration of filters and/or splitters in the beam path from the flow cell 1625 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 1697 can be configured to receive data regarding a flow cytometer experiment having a panel of fluorescent labels and a plurality of cell populations having a plurality of markers, each cell population having a subset of the plurality of markers. The I/O 1697 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 1695. The controller/processor 1690 can be configured to evaluate one or more assignments of labels to markers.

One of skill in the art will recognize that a flow cytometer in accordance with an embodiment of the present invention is not limited to the flow cytometer depicted in FIG. 16, but can include any flow cytometer known in the art. For example, a flow cytometer may have any number of lasers, beam splitters, filters, and detectors at various wavelengths and in various different configurations.

Figure 17:
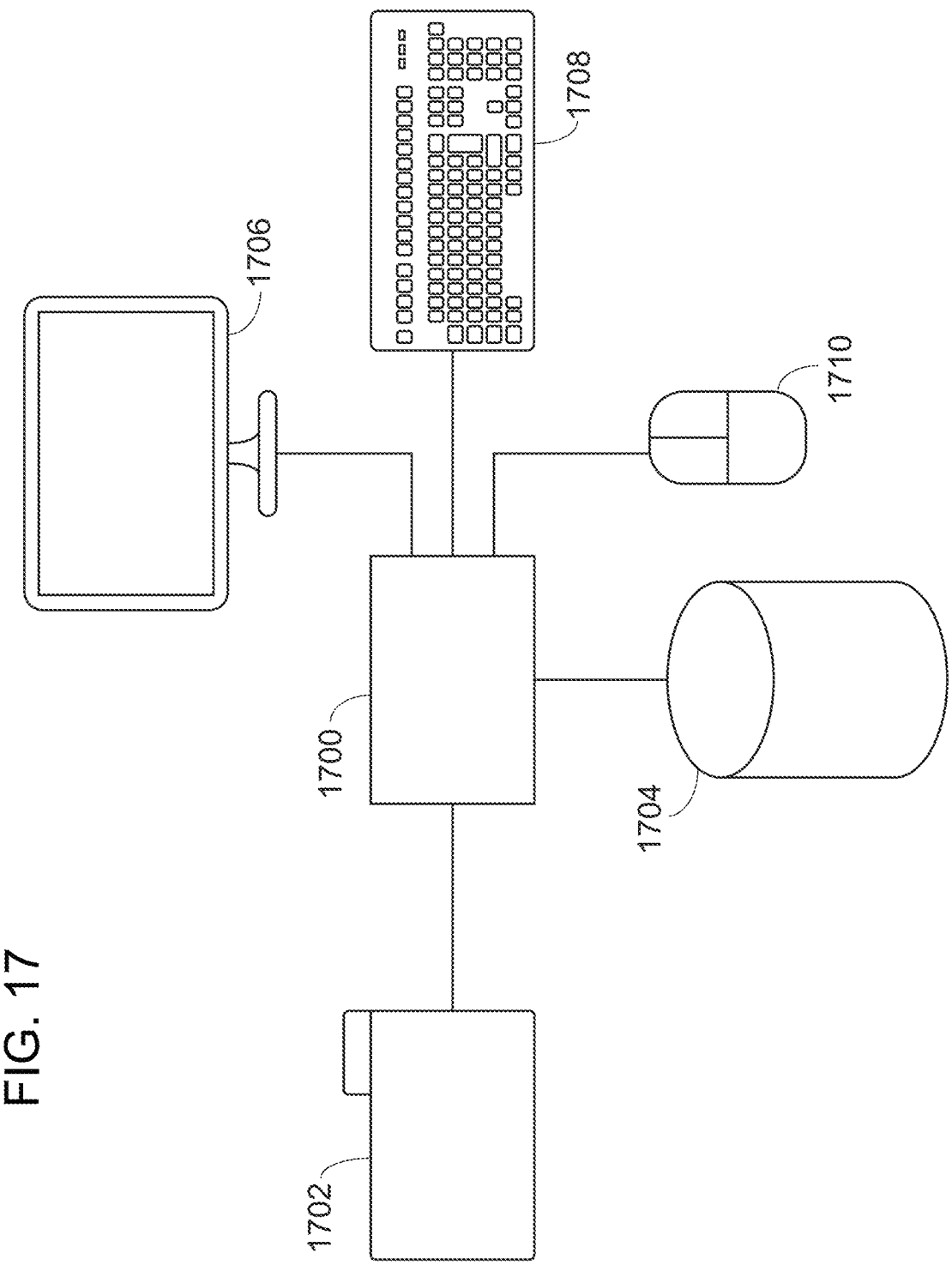
FIG. 17 depicts a system according to certain embodiments.

FIG. 17 shows a functional block diagram for one example of a processor 1700, for analyzing and displaying data. A processor 1700 can be configured to implement a variety of processes for controlling graphic display of biological events. A flow cytometer 1702 can be configured to acquire flow cytometer data by analyzing a biological sample (e.g., as described above). The apparatus can be configured to provide biological event data to the processor 1700. A data communication channel can be included between the flow cytometer 1702 and the processor 1700. The data can be provided to the processor 1700 via the data communication channel. The processor 1700 can be configured to provide a graphical display including plots (e.g., as described above) to display 1706. The processor 1700 can be further configured to render a gate around populations of flow cytometer data shown by the display device 1706, overlaid upon the plot, for example. In some embodiments, the gate can be a logical combination of one or more graphical regions of interest drawn upon a single parameter histogram or bivariate plot. In some embodiments, the display can be used to display analyte parameters or saturated detector data.

The processor 1700 can be further configured to display flow cytometer data on the display device 1706 within the gate differently from other events in the fluorescent flow cytometer data outside of the gate. For example, the processor 1700 can be configured to render the color of fluorescent flow cytometer data contained within the gate to be distinct from the color of fluorescent flow cytometer data outside of the gate. In this way, the processor 1700 may be configured to render different colors to represent each unique population of data. The display device 1706 can be implemented as a monitor, a tablet computer, a smartphone, or other electronic device configured to present graphical interfaces.

The processor 1700 can be configured to receive a gate selection signal identifying the gate from a first input device. For example, the first input device can be implemented as a mouse 1710. The mouse 1710 can initiate a gate selection signal to the processor 1700 identifying the population to be displayed on or manipulated via the display device 1706 (e.g., by clicking on or in the desired gate when the cursor is positioned there). In some implementations, the first device can be implemented as the keyboard 1708 or other means for providing an input signal to the processor 1700 such as a touchscreen, a stylus, an optical detector, or a voice recognition system. Some input devices can include multiple inputting functions. In such implementations, the inputting functions can each be considered an input device. For example, as shown in FIG. 17, the mouse 1710 can include a right mouse button and a left mouse button, each of which can generate a triggering event.

The triggering event can cause the processor 1700 to alter the manner in which the fluorescent flow cytometer data is displayed, which portions of the data is actually displayed on the display device 1706, and/or provide input to further processing such as selection of a population of interest for analysis.

In some embodiments, the processor 1700 can be configured to detect when gate selection is initiated by the mouse 1710. The processor 1700 can be further configured to automatically modify plot visualization to facilitate the gating process. The modification can be based on the specific distribution of data received by the processor 1700.

The processor 1700 can be connected to a storage device 1704. The storage device 1704 can be configured to receive and store data from the processor 1700. The storage device 1704 can be further configured to allow retrieval of data, such as flow cytometer data, by the processor 1700.

A display device 1706 can be configured to receive display data from the processor 1700. The display data can comprise plots of fluorescent flow cytometer data and gates outlining sections of the plots. The display device 1706 can be further configured to alter the information presented according to input received from the processor 1700 in conjunction with input from apparatus 1702, the storage device 1704, the keyboard 1708, and/or the mouse 1710.

In some implementations the processor 1700 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for receiving a laser beam profile of the diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT, Windows XP, Windows 7, Windows 8, iOS, Sun Solaris, Linux, OS/400, Compaq Tru64 Unix, SGI IRIX, Siemens Reliant Unix, and others.

Figure 18:
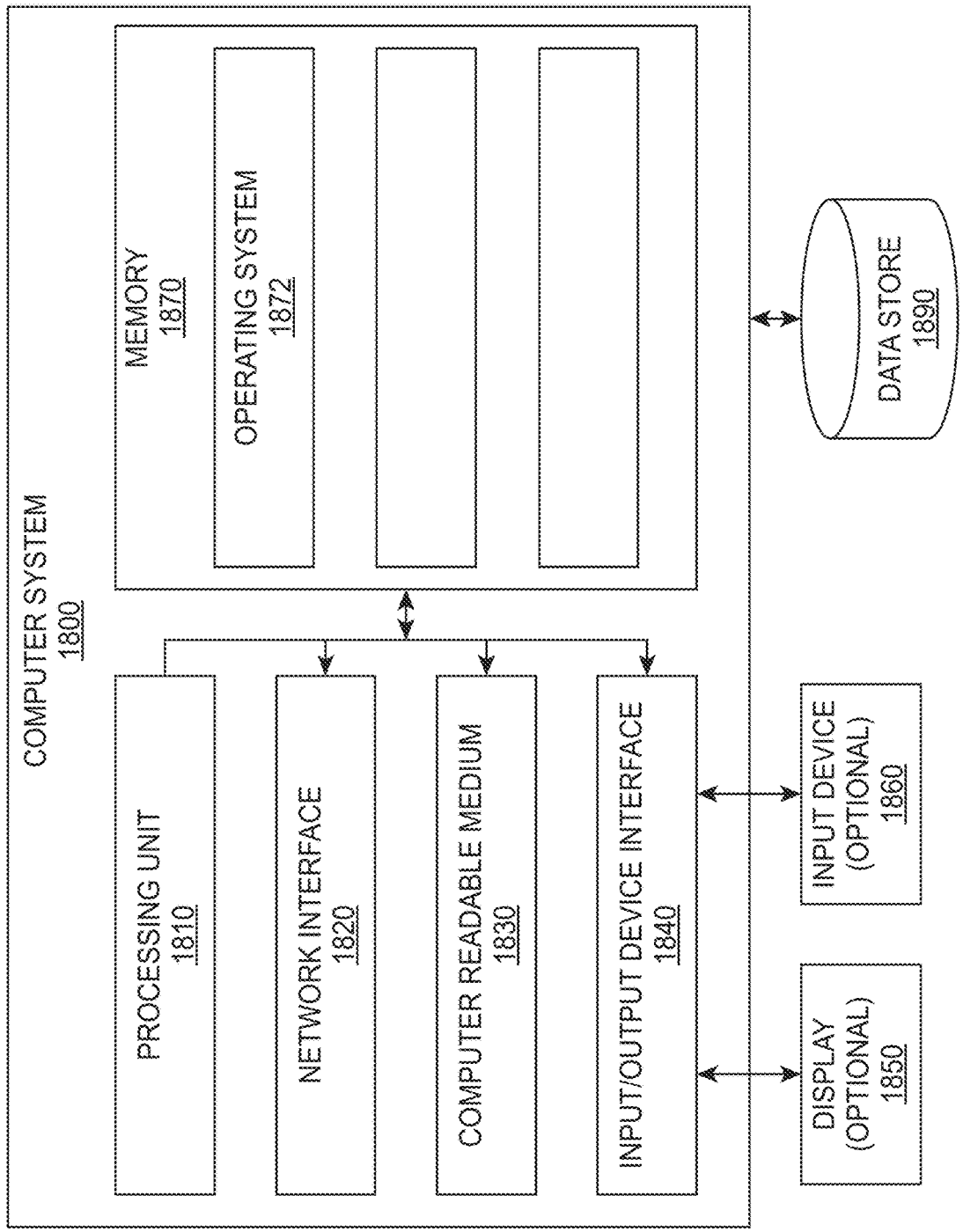
FIG. 18 depicts a computer-controlled system according to certain embodiments.

FIG. 18 depicts a general architecture of an example computing device 1800 according to certain embodiments. The general architecture of the computing device 1800 depicted in FIG. 18 includes an arrangement of computer hardware and software components. It is not necessary, however, that all of these generally conventional elements be shown in order to provide an enabling disclosure. As illustrated, the computing device 1800 includes a processing unit 1810, a network interface 1820, a computer readable medium drive 1830, an input/output device interface 1840, a display 1850, and an input device 1860, all of which may communicate with one another by way of a communication bus. The network interface 1820 may provide connectivity to one or more networks or computing systems. The processing unit 1810 may thus receive information and instructions from other computing systems or services via a network. The processing unit 1810 may also communicate to and from memory 1870 and further provide output information for an optional display 1850 via the input/output device interface 1840. For example, an analysis software (e.g., data analysis software or program such as FlowJo®) stored as executable instructions in the non-transitory memory of the analysis system can display the flow cytometry event data to a user. The input/output device interface 1840 may also accept input from the optional input device 1860, such as a keyboard, mouse, digital pen, microphone, touch screen, gesture recognition system, voice recognition system, gamepad, accelerometer, gyroscope, or other input device.

The memory 1870 may contain computer program instructions (grouped as modules or components in some embodiments) that the processing unit 1810 executes in order to implement one or more embodiments. The memory 1870 generally includes RAM, ROM and/or other persistent, auxiliary or non-transitory computer-readable media. The memory 1870 may store an operating system 1872 that provides computer program instructions for use by the processing unit 1810 in the general administration and operation of the computing device 1800. Data may be stored in data storage device 1890. The memory 1870 may further include computer program instructions and other information for implementing aspects of the present disclosure.

Computer-Readable Storage Media

Aspects of the present disclosure further include non-transitory computer readable storage media having instructions for practicing the subject methods. Computer readable storage media may be employed on one or more computers for complete automation or partial automation of a system for practicing methods described herein. In some embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. In some instances, instructions may be provided on an integrated circuit device. Integrated circuit devices of interest may include, in certain instances, a reconfigurable field programmable gate array (FPGA), an application specific integrated circuit (ASIC) or a complex programmable logic device (CPLD). A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions for receiving a laser beam profile of the diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting.

The computer readable storage medium may be employed on more or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, Python, C++, other high level or low level languages, as well as combinations thereof, as is known in the art. The operating system also provides scheduling, input-output control, file and data management, memory management, and communication control and related services, all in accordance with known techniques.

Utility

The subject devices, methods and computer systems find use in a variety of applications where it is desirable to increase resolution and accuracy in the determination of parameters for analytes (e.g., cells, particles) in a biological sample. The subject devices, methods and computer systems particularly find use in determining whether a given diode laser is suitable for use in a certain setting, e.g., a flow cytometry setting. The present invention especially finds use in situations where conventional metrics for evaluating lasers, such as beam quality ($M^2$), are not predictive of a diode laser's ability to produce high-quality results in a flow cytometry setting. As such, the subject devices, methods and computer systems may be used to screen out diode lasers that would exhibit failing levels of CV if that laser were to be incorporated in a flow cytometer. In some embodiments, the subject methods and systems provide fully automated protocols so that adjustments to data require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include storage media such as a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the program storage media include instructions receiving a laser beam profile of the diode laser, determining first, second and third laser beam widths at first, second and third laser intensities, respectively, for the laser beam profile, computing a first ratio between the second and third laser beam widths, computing a second ratio between the first and second laser beam widths, evaluating laser performance based on the first and second ratios, and outputting a determination regarding the suitability of the laser for use in a flow cytometry setting.

In addition to the above components, the subject kits may further include (in some embodiments) instructions. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for evaluating performance of a diode laser, the method comprising:
   receiving by a processor operably connected to a beam profiler, a laser beam profile of the diode laser, the laser beam profile comprising laser beam width data and laser intensity data;
   determining by said processor, first, second and third laser beam widths at first, second and third laser intensities, respectively, for the laser beam profile;
   said processor computing:
   a first ratio between the second and third laser beam widths; and
   a second ratio between the first and second laser beam widths; and
   evaluating laser performance based on the first and second ratios;
   evaluating the diode laser in conjunction with a beam shaping optical component that is placed in an optical path of the diode laser;
   and optically aligning the diode laser and the beam shaping optical component by adjusting a position of the diode laser and/or the beam shaping optical component.

2. The method according to claim 1, wherein the diode laser is a semiconductor laser diode.

3. The method according to claim 1, wherein evaluating performance of the diode laser comprises assessing the extent to which the laser beam profile deviates from a Gaussian beam shape.

4. The method according to claim 3, wherein assessing the extent to which the laser beam profile deviates from a Gaussian beam shape comprises identifying whether multiple modes are present in the laser beam profile.

5. The method according to claim 3, wherein assessing the extent to which the laser beam profile deviates from a Gaussian beam shape comprises identifying whether a wide bottom is present in the laser beam profile.

6. The method according to claim 3, wherein assessing the extent to which the laser beam profile deviates from a Gaussian beam shape comprises identifying whether a narrow peak is present in the laser beam profile.

7. The method according to claim 3, wherein assessing the extent to which the laser beam profile deviates from a Gaussian beam shape comprises identifying whether a sidelobe pattern is present in the laser beam profile.

8. The method according to claim 3, wherein large values computed for the first ratio and the second ratio indicate that the beam profile deviates from a Gaussian beam shape.

9. The method according to claim 1, wherein evaluating the performance of the laser further comprises outputting a determination regarding the suitability of the laser for use in a flow cytometry setting.

10. The method according to claim 9, wherein outputting the determination regarding the suitability of the laser for use in a flow cytometry setting comprises assessing a comparison between each of the first and second ratios, and respective reference ratios demarcating the boundaries of an acceptable laser beam profile.

11. The method according to claim 10, wherein the determination regarding the suitability of the laser for use in a flow cytometry setting is a binary determination.

12. The method according to claim 1, wherein the beam shaping optical component is selected from a beam collimator, a telescope, a beam expander, a prism pair, and a focusing component.

13. The method according to claim 1, wherein the laser beam profile further comprises $M^2$ data.

14. The method according to claim 1, wherein the laser beam profile further comprises beam waist data.

15. The method according to claim 1, wherein the laser beam profile further comprises beam divergence data.

16. The method according to claim 1, wherein the laser beam profile comprises a horizontal laser beam profile and a vertical laser beam profile.

17. The method according to claim 16, further comprising evaluating laser performance with respect to each of the horizontal laser beam profile and the vertical laser beam profile.

18. A device for evaluating diode laser performance, the device comprising:
a first stage configured to receive a diode laser;
a second stage with a beam profiler positioned thereon configured to be irradiated by the received diode laser; and
a processor operably connected to the beam profiler comprising memory operably coupled to the processor wherein the memory comprises instructions stored thereon, which when executed by the processor, cause the processor to:
receive a laser beam profile of the diode laser, the laser beam profile comprising laser beam width data and laser intensity data;
determine first, second and third laser beam widths at first, second and third laser intensities, respectively, for the laser beam profile;
compute:
a first ratio between the second and third laser beam widths; and
a second ratio between the first and second laser beam widths; and
evaluate laser performance based on the first and second ratios;
evaluating the diode laser in conjunction with a beam shaping optical component that is placed in an optical path of the diode laser; and
optically aligning the diode laser and the beam shaping optical component by adjusting a position of the diode laser and/or the beam shaping optical component.

* * * * *